US012532274B2

(12) United States Patent
Wang

(10) Patent No.: US 12,532,274 B2
(45) Date of Patent: Jan. 20, 2026

(54) BROADCAST DATA COMMUNICATION METHOD AND APPARATUS, AND DEVICE

(71) Applicant: DATANG MOBILE COMMUNICATIONS EQUIPMENT CO., LTD., Beijing (CN)

(72) Inventor: Junwei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 384 days.

(21) Appl. No.: 18/017,414

(22) PCT Filed: Jul. 27, 2021

(86) PCT No.: PCT/CN2021/108766
§ 371 (c)(1),
(2) Date: Jan. 23, 2023

(87) PCT Pub. No.: WO2022/022538
PCT Pub. Date: Feb. 3, 2022

(65) Prior Publication Data
US 2024/0023041 A1    Jan. 18, 2024

(30) Foreign Application Priority Data
Jul. 27, 2020    (CN) .......................... 202010733381.X

(51) Int. Cl.
H04J 3/06        (2006.01)
H04W 56/00       (2009.01)
(Continued)

(52) U.S. Cl.
CPC ... H04W 56/0015 (2013.01); H04W 72/0446 (2013.01); H04W 72/30 (2023.01)

(58) Field of Classification Search
CPC ......... H04W 56/0015; H04W 72/0446; H04W 72/30; H04W 4/06; H04W 48/16;
(Continued)

(56) References Cited

U.S. PATENT DOCUMENTS 10,257,848 B2 *  4/2019  Sun ..................... H04B 7/0417
10,334,617 B2 *  6/2019  Rico Alvarino ........ H04W 4/70
(Continued)

FOREIGN PATENT DOCUMENTS

CN    109391906 A    2/2019
CN    110574447 A   12/2019
(Continued)

OTHER PUBLICATIONS

Ericsson, "Extended PO and early termination for page monitoring", 3GPP TSG-RAN WG2 #107bis, Chongqing, China, Oct. 14-18, 2019, total 9 pages, R2-1913967(Revision of R2-1912644).
(Continued)

Primary Examiner — Stephen M D Agosta
(74) Attorney, Agent, or Firm — KILPATRICK TOWNSEND & STOCKTON LLP

(57) ABSTRACT

Disclosed are a broadcast data transmission method and apparatus, and a device. The method includes determining first configuration information of a beam switching position, or, using second configuration information of a second cyclic prefix (CP), and the first configuration information/the second configuration information includes a configured synchronization signal block (SSB) candidate position, a broadcast control channel detection occasion, and a time-domain scheduling parameter of a data channel for receiving broadcast data; and according to the first configuration information/the second configuration information, transmitting an SSB and a broadcast control channel in a beam behind the beam switching position or the CP. By using the (Continued)

method provided in the present disclosure, the problem of efficient reception of broadcast data under beam switching during higher SCS can be solved.

4 Claims, 12 Drawing Sheets

(51) Int. Cl.
*H04W 72/0446* (2023.01)
*H04W 72/30* (2023.01)

(58) Field of Classification Search
CPC . H04L 27/2607; H04L 5/0007; H04L 5/0025; H04L 5/005; H04L 27/2602; H04L 5/0094; H04L 5/0053; H04B 7/0695; Y02D 30/70
See application file for complete search history.

(56) References Cited

U.S. PATENT DOCUMENTS

| | | | | |
|---|---|---|---|---|
| 10,362,610 | B2* | 7/2019 | Chen | H04W 74/002 |
| 10,368,301 | B2* | 7/2019 | Chendamarai Kannan | H04B 7/06952 |
| 10,462,761 | B2* | 10/2019 | Li | H04W 56/001 |
| 10,582,486 | B2* | 3/2020 | Nam | H04W 56/001 |
| 10,594,428 | B2* | 3/2020 | Shimezawa | H04L 1/0003 |
| 10,681,715 | B2* | 6/2020 | Zhou | H04L 5/0091 |
| 10,687,356 | B2* | 6/2020 | Lei | H04W 28/26 |
| 10,728,916 | B2* | 7/2020 | Ly | H04W 24/02 |
| 10,763,984 | B2* | 9/2020 | Sun | H04W 56/001 |
| 10,856,329 | B2* | 12/2020 | Li | H04B 7/0695 |
| 10,917,913 | B2* | 2/2021 | Cariou | H04B 7/0413 |
| 10,925,091 | B2* | 2/2021 | Zhang | H04L 5/0048 |
| 10,959,264 | B2* | 3/2021 | Bang | H04W 74/08 |
| 10,965,420 | B2* | 3/2021 | John Wilson | H04L 5/005 |
| 11,039,327 | B2* | 6/2021 | John Wilson | H04W 72/0446 |
| 11,115,983 | B2* | 9/2021 | Sun | H04B 7/088 |
| 11,502,891 | B2* | 11/2022 | Choi | H04L 5/0048 |
| 11,601,253 | B2* | 3/2023 | Reddy | H04L 27/2602 |
| 11,997,698 | B2* | 5/2024 | Catovic | H04L 5/0051 |
| 12,126,557 | B2* | 10/2024 | Kim | H04L 5/0053 |
| 2017/0230994 | A1* | 8/2017 | You | H04L 5/0053 |
| 2018/0199363 | A1* | 7/2018 | Lee | H04L 5/0094 |
| 2018/0302889 | A1* | 10/2018 | Guo | H04B 17/309 |
| 2018/0368054 | A1* | 12/2018 | Sheng | H04L 5/0048 |
| 2019/0020448 | A1* | 1/2019 | John Wilson | H04L 5/0053 |
| 2019/0058538 | A1* | 2/2019 | Sun | H04W 56/001 |
| 2019/0059106 | A1* | 2/2019 | Zhang | H04W 56/001 |
| 2019/0098590 | A1* | 3/2019 | Nam | H04W 72/23 |
| 2019/0150121 | A1* | 5/2019 | Abdoli | H04L 5/0092 370/329 |
| 2019/0159180 | A1* | 5/2019 | Ly | H04L 5/0044 |
| 2019/0159226 | A1 | 5/2019 | Ly et al. | |
| 2019/0230534 | A1* | 7/2019 | John Wilson | H04W 48/12 |
| 2019/0306832 | A1 | 10/2019 | Si et al. | |
| 2019/0313428 | A1* | 10/2019 | Zhou | H04L 27/2602 |
| 2019/0313434 | A1* | 10/2019 | Zhou | H04W 72/23 |
| 2020/0008131 | A1* | 1/2020 | Chakraborty | H04W 24/08 |
| 2020/0275406 | A1 | 8/2020 | Shi et al. | |
| 2020/0280945 | A1* | 9/2020 | Tiirola | H04W 74/0808 |
| 2021/0022095 | A1* | 1/2021 | Jiang | H04L 5/005 |
| 2021/0051683 | A1* | 2/2021 | Li | H04W 56/001 |
| 2021/0176670 | A1* | 6/2021 | Keskitalo | H04L 5/0048 |
| 2022/0095118 | A1* | 3/2022 | Harada | H04L 5/0044 |

FOREIGN PATENT DOCUMENTS

| | | |
|---|---|---|
| CN | 111181702 A | 5/2020 |
| WO | 2016134532 A1 | 9/2016 |
| WO | 2020091554 A1 | 5/2020 |
| WO | 2020095458 A1 | 5/2020 |

OTHER PUBLICATIONS

Ericsson,"Remaining issues on paging", 3GPP TSG-RAN WG2 #108, Reno, USA, Oct. 18-22, 2019, total 8 pages, R2-1914647(Revision of R2-1913967).

* cited by examiner

Single-slot definition, SSBs are continuous:

Multi-slot definition, SSBs are continuous:

Single-slot definition, SSBs are discontinuous:

Case 1 (Slot containing 2 SSBs)

Time-domain scheduling parameters of PDSCH:
S=2, L=4
S=9, L=4

Case 2 (Slot containing 1 SSB)

Time-domain scheduling parameters of PDSCH
S=2, L=11
S=6, L=7

Case 1 (Slot containing 2 SSBs)

⇨ Time-domain scheduling parameters of PDSCH:
S=4, L=2
S=7, L=2
S=11, L=2

Case 2 (Slot containing 1 SSB)

⇨ Time-domain scheduling parameters of PDSCH
S=4, L=9
S=6, L=7

Time-domain scheduling parameters of PDSCH:
S=3, L=4
S=10, L=4

Time-domain scheduling parameters of PDSCH
S=3, L=11
S=5, L=9

Case 1 (Slot containing 2 SSBs)

Time-domain scheduling parameters of PDSCH:
S=5, L=3
S=11, L=3

Case 2 (Slot containing 1 SSB)

Time-domain scheduling parameters of PDSCH
S=5, L=9
S=7, L=7

Frequency division multiplexing mode (mode 3):
Time-domain scheduling parameters of PDSCH 2 SSBs are actually sent in one slot 1 SSB is actually sent in one slot Time division multiplexing mode (mode 1):
Time-domain scheduling parameters of PDSCH ⇨ Time-domain parameter
table of PDSCH
S=2, L=4
S=8, L=4

⇨ Time-domain parameter
table of PDSCH
S=2, L=10
S=6, L=6

BROADCAST DATA COMMUNICATION METHOD AND APPARATUS, AND DEVICE

CROSS-REFERENCE OF RELATED APPLICATIONS

The present application is a National Stage of International Application No. PCT/CN2021/108766, filed on Jul. 27, 2021, which claims the priority from Chinese Patent Application No. 202010733381.X, filed with the Chinese Patent Office on Jul. 27, 2020 and entitled "Method, Apparatus and Device for Broadcast Data Communication", both of which are hereby incorporated by reference in their entireties.

FIELD OF DISCLOSURE

The disclosure relates to the field of wireless communication technologies, and specifically to a method, apparatus and device for broadcast data communication.

BACKGROUND

With the development of wireless communication, the people's demand for mobile communication is getting higher and higher, especially in terms of communication bandwidth and communication rate. It is expected to reach a rate of Gbit level. In order to meet the people's demand for high communication rate, it is necessary to develop the spectrum with a larger bandwidth. In the current 5G New Radio (NR) technology, the mobile phones and base stations have been supported to communicate on two Frequency Ranges (FRs), and the range of FR1 is: 410 MHz to 7.125 GHz, and the range of FR2 is 24.25 GHz to 52.6 GHz.

The current 3rd Generation Partnership Project (3GPP) standard has begun to study the mobile wireless communication on the frequency band of 52.6 GHz to 71 GHz. The higher communication frequency can bring the greater bandwidth advantage but bring greater challenges to the wireless communication design, mainly: the higher frequency has a greater Doppler frequency deviation, and at the same time, the greater phase noise is also generated. In order to address the effect of Doppler and phase noise caused by the high frequency, a higher Sub-Carrier Spacing (SCS) is used, for example: SCS=240 KHz, SCS=480 KHz, SCS=960 KHz.

In order to overcome the increase in path loss and decrease in coverage due to carrier rise, the high-gain beamforming technology will be adopted. When the base station sends beams in different directions, it takes time for beam switching. It is generally considered that the switching time is about 100 nanoseconds to 200 nanoseconds. For example, when SCS=960 KHz, the beam switching time exceeds the CP time of 1 symbol, and needs to occupy the time of useful Orthogonal Frequency Division Multiplexing (OFDM). The introduction of beam switching symbols in the communication system will have an impact on the existing technology system, and it is necessary to study a method for Synchronization Signal Block (SSB) transmission/Remaining Minimum System Information (RMSI) data scheduling in the presence of beam switching.

In the current NR design, since the SCS is relatively small, the Cyclic Prefix (CP) is relatively long, and the beam switching time is less than the CP, there is no need to consider reserving time for beam switching of the scheduling data. When communicating on a high frequency, it is necessary to provide a data communication scheme for the above scheduling data in the presence of beam switching (including: a candidate position of an SSB, Type 0-Physical Downlink Control Channel (Type0-PDCCH) time-domain parameters, a time-domain parameter table of Physical Downlink Shared Channel (PDSCH) scheduling).

BRIEF SUMMARY

The disclosure provides a method, apparatus and device for broadcast data communication, to solve the problem of not considering reserving time for beam switching of the scheduling data and the beam switching affects the normal communication when the higher SCS is used in the current NR design.

One embodiment of the disclosure provides a method for broadcast data communication, including:
  determining first configuration information containing a beam switching position, or determining second configuration information containing an extended CP, and the first configuration information/second configuration information includes a configured SSB candidate position, a broadcast control channel monitoring occasion, and a time-domain scheduling parameter of a data channel for receiving broadcast data;
  transmitting an SSB and a broadcast control channel in a beam after the beam switching position or extended CP according to the first configuration information/second configuration information.

In one embodiment, for the first configuration information, the SSB candidate position is configured as:
  each SSB candidate position occupies a fixed number of OFDM symbols, and SSB candidate positions of two adjacent SSBs are discontinuous.

In one embodiment, for the first configuration information, there are two beam switching positions in one slot, which are configured in any one of following ways:
  a beam switching position of a first SSB in the slot is set at a first symbol of the slot, or a last symbol of a previous slot;
  a beam switching position of a second SSB in the slot is set at a symbol adjacent to a last symbol of the first SSB, or a previous symbol of a start symbol of the second SSB.

In one embodiment, for the first configuration information, the broadcast control channel monitoring occasion is configured as any one of:
  a start symbol of a broadcast control channel corresponding to a first SSB in a slot is a first symbol after a beam switching position of the first SSB, or is in a position same as a position of a start symbol of the first SSB;
  a start symbol of a broadcast control channel corresponding to a second SSB in the slot is a first symbol after a beam switching position of the second SSB, or is in a position same as a position of a start symbol of the second SSB.

In one embodiment, for the first configuration information, the time-domain scheduling parameter of the data channel is configured in a following way:
  the time-domain scheduling parameter of the data channel is related to the beam switching position; or
  the time-domain scheduling parameter of the data channel is related to an end symbol of the broadcast control channel monitoring occasion.

In one embodiment, the time-domain scheduling parameter of the data channel includes a start symbol and the number of symbols, and the time-domain scheduling parameter of the data channel is configured in a following way:

the start symbol of the data channel ends with the beam switching symbol or begins with the beam switching symbol.

In one embodiment, the beam switching position is determined by:
determining the beam switching position through indication information of the beam switching position defined by an interface protocol; or
determining the beam switching position through the SSB candidate position, the broadcast control channel monitoring occasion, and the time-domain scheduling parameter of the data channel for receiving the broadcast data configured in the first configuration information.

In one embodiment, determining the beam switching position includes at least one of following steps:
determining that a beam switching position of a first SSB in a slot is at a first symbol of the slot if a broadcast control channel corresponding to the first SSB in the slot is at a second symbol of the slot;
determining that the beam switching position of the first SSB in the slot is at a last symbol of a previous slot if the broadcast control channel corresponding to the first SSB in the slot is at the first symbol of the slot;
determining that a beam switching position of a second SSB is at a symbol adjacent to a last symbol of the first SSB if there is an interval of only one symbol between a start symbol of a broadcast control channel corresponding to the second SSB in the slot and the last symbol of the first SSB in the slot;
determining that the beam switching position of the second SSB is at a previous symbol of a start symbol of the second SSB if a frequency division multiplexing mode is used for the broadcast control channel and the second SSB in the slot.

In one embodiment, when a multiplexing relationship between the SSB and the broadcast control channel is using a time division multiplexing mode 1, the broadcast control channel monitoring occasion and the time-domain scheduling parameter of the data channel are configured as:
at least one time-domain scheduling parameter among {S=2, L=4}, {S=9, L=4}, {S=2, L=11} and {S=6, L=7}; or
at least one time-domain scheduling parameter among {S=3, L=3}, {S=10, L=3}, {S=3, L=10} and {S=6, L=7}; or
at least one time-domain scheduling parameter among {S=1, L=5}, {S=8, L=5}, {S=1, L=12} and {S=6, L=7};
and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:
at least one time-domain scheduling parameter among {S=4, L=2}, {S=7, L=2}, {S=11, L=2}, {S=4, L=9} and {S=6, L=7}; or
at least one time-domain scheduling parameter among {S=5, L=1}, {S=7, L=2}, {S=12, L=1}, {S=5, L=8} and {S=6, L=7}; or
at least one time-domain scheduling parameter among {S=3, L=3}, {S=7, L=2}, {S=10, L=3}, {S=3, L=10} and {S=6, L=7};
and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:
at least one time-domain scheduling parameter among {S=3, L=4}, {S=10, L=4}, {S=3, L=11}, {S=5, L=9}, {S=5, L=3}, {S=11, L=3} and {S=7, L=7}; or
at least one time-domain scheduling parameter among {S=4, L=3}, {S=11, L=3}, {S=4, L=10}, {S=5, L=9}, {S=6, L=2}, {S=12, L=2} and {S=7, L=7}; or
at least one time-domain scheduling parameter among {S=2, L=5}, {S=9, L=5}, {S=2, L=12}, {S=5, L=9}, {S=4, L=4}, {S=10, L=4} and {S=7, L=7};
and S is a start symbol of the data channel, and L is the number of symbols of the data channel.

In one embodiment, when a multiplexing relationship between the SSB and the broadcast control channel is using a frequency division multiplexing mode 2, the broadcast control channel monitoring occasion and the time-domain scheduling parameter of the data channel are configured as:
at least one time-domain scheduling parameter among {S=4, L=2}, {S=7, L=2}, {S=9, L=2}, {S=12, L=2}, {S=4, L=3}, {S=4, L=5}, {S=9, L=3} and {S=9, L=5};
and S is a start symbol of the data channel, and L is the number of symbols of the data channel.

In one embodiment, for the second configuration information, the SSB candidate position is configured as:
in a single-slot configuration, a first SSB candidate position: symbol number 4/5/6/7, and a second SSB candidate position: symbol number 8/9/10/11; or in a single-slot configuration, a first SSB candidate position: symbol number 2/3/4/5, and a second SSB candidate position: symbol number 6/7/8/9; or
in a multi-slot configuration, a first SSB candidate position: symbol number 4/5/6/7, a second SSB candidate position: symbol number 8/9/10/11, a third SSB candidate position: symbol number 14/15/16/17, and a fourth SSB candidate position: symbol number 18/19/20/21; or
in a single-slot configuration, a first SSB candidate position: symbol number 2/3/4/5, and a second SSB candidate position: symbol number 8/9/10/11.

In one embodiment, for the second configuration information, when a multiplexing relationship between the SSB and the broadcast control channel is using a frequency division multiplexing mode 3, the broadcast control channel monitoring occasion and the time-domain scheduling parameter of the data channel are configured as:
at least one time-domain scheduling parameter among {S=6, L=2}, {S=10, L=2}, {S=4, L=2}, {S=8, L=4}, {S=6, L=6} and {S=4, L=8}; or
at least one time-domain scheduling parameter among {S=7, L=1}, {S=11, L=1}, {S=5, L=1}, {S=9, L=3}, {S=7, L=5} and {S=5, L=7}; or
at least one time-domain scheduling parameter among {S=5, L=3}, {S=9, L=3}, {S=3, L=3}, {S=7, L=5}, {S=5, L=7} and {S=3, L=9};
and S is a start symbol of the data channel, and L is the number of symbols of the data channel.

In one embodiment, for the second configuration information, when a multiplexing relationship between the SSB and the broadcast control channel is using a time division multiplexing mode 1, the broadcast control channel monitoring occasion and the time-domain scheduling parameter of the data channel are configured as:

at least one time-domain scheduling parameter among {S=2, L=4}, {S=8, L=4}, {S=6, L=6} and {S=2, L=10}; or at least one time-domain scheduling parameter among {S=1, L=5}, {S=7, L=5}, {S=5, L=7} and {S=1, L=11};

and S is a start symbol of the data channel, and L is the number of symbols of the data channel.

In one embodiment, the method is applied to a base station, transmitting the SSB and the broadcast control channel in the beam after the beam switching position or extended CP includes:

sending the SSB and the broadcast control channel in the beam after the beam switching position or extended CP according to the SSB candidate position and the broadcast control channel monitoring occasion;

sending the broadcast data in the data channel according to the broadcast control channel and the time-domain scheduling parameter.

In one embodiment, the method is applied to a UE, transmitting the SSB and the broadcast control channel in the beam after the beam switching position or extended CP includes:

receiving the SSB and the broadcast control channel in the beam after the beam switching position or extended CP according to the SSB candidate position and the broadcast control channel monitoring occasion;

receiving the broadcast data in the data channel according to the broadcast control channel and the time-domain scheduling parameter.

One embodiment of the disclosure further provides a device for broadcast data communication, including a memory and a processor, and:

the memory is configured to store a computer program;

the processor is configured to read the program in the memory and perform following steps:

determining first configuration information containing a beam switching position, or determining second configuration information containing an extended CP, and the first configuration information/second configuration information includes a configured SSB candidate position, a broadcast control channel monitoring occasion, and a time-domain scheduling parameter of a data channel for receiving broadcast data;

transmitting an SSB and a broadcast control channel in a beam after the beam switching position or extended CP according to the first configuration information/second configuration information.

In one embodiment, for the first configuration information, the SSB candidate position is configured as:

each SSB candidate position occupies a fixed number of OFDM symbols, and SSB candidate positions of two adjacent SSBs are discontinuous.

In one embodiment, for the first configuration information, there are two beam switching positions in one slot, which are configured in any one of following ways:

a beam switching position of a first SSB in the slot is set at a first symbol of the slot, or a last symbol of a previous slot;

a beam switching position of a second SSB in the slot is set at a symbol adjacent to a last symbol of the first SSB, or a previous symbol of a start symbol of the second SSB.

In one embodiment, for the first configuration information, the broadcast control channel monitoring occasion is configured as any one of:

a start symbol of a broadcast control channel corresponding to a first SSB in a slot is a first symbol after a beam switching position of the first SSB, or is in a position same as a position of a start symbol of the first SSB;

a start symbol of a broadcast control channel corresponding to a second SSB in the slot is a first symbol after a beam switching position of the second SSB, or is in a position same as a position of a start symbol of the second SSB.

In one embodiment, for the first configuration information, the time-domain scheduling parameter of the data channel is configured in a following way:

the time-domain scheduling parameter of the data channel is related to the beam switching position; or the time-domain scheduling parameter of the data channel is related to an end symbol of the broadcast control channel monitoring occasion.

In one embodiment, the time-domain scheduling parameter of the data channel includes a start symbol and the number of symbols, and the time-domain scheduling parameter of the data channel is configured in a following way:

the start symbol of the data channel ends with the beam switching symbol or begins with the beam switching symbol.

In one embodiment, the processor is configured to:

determine the beam switching position through indication information of the beam switching position defined by an interface protocol; or determine the beam switching position through the SSB candidate position, the broadcast control channel monitoring occasion, and the time-domain scheduling parameter of the data channel for receiving the broadcast data configured in the first configuration information.

In one embodiment, the processor determines the beam switching position by at least one of following steps:

determining that a beam switching position of a first SSB in a slot is at a first symbol of the slot if a broadcast control channel corresponding to the first SSB in the slot is at a second symbol of the slot;

determining that the beam switching position of the first SSB in the slot is at a last symbol of a previous slot if the broadcast control channel corresponding to the first SSB in the slot is at the first symbol of the slot;

determining that a beam switching position of a second SSB is at a symbol adjacent to a last symbol of the first SSB if there is an interval of only one symbol between a start symbol of a broadcast control channel corresponding to the second SSB in the slot and the last symbol of the first SSB in the slot;

determining that the beam switching position of the second SSB is at a previous symbol of a start symbol of the second SSB if a frequency division multiplexing mode is used for the broadcast control channel and the second SSB in the slot.

In one embodiment, when a multiplexing relationship between the SSB and the broadcast control channel is using a time division multiplexing mode 1, the broadcast control channel monitoring occasion and the time-domain scheduling parameter of the data channel are configured as:

at least one time-domain scheduling parameter among {S=2, L=4}, {S=9, L=4}, {S=2, L=11} and {S=6, L=7}; or at least one time-domain scheduling parameter among {S=3, L=3}, {S=10, L=3}, {S=3, L=10} and {S=6, L=7}; or at least one time-domain scheduling parameter among {S=1, L=5}, {S=8, L=5}, {S=1, L=12} and {S=6, L=7};

and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:

at least one time-domain scheduling parameter among {S=4, L=2}, {S=7, L=2}, {S=11, L=2}, {S=4, L=9} and {S=6, L=7}; or at least one time-domain scheduling parameter among {S=5, L=1}, {S=7, L=2}, {S=12, L=1}, {S=5, L=8} and {S=6, L=7}; or at least one time-domain scheduling parameter among {S=3, L=3}, {S=7, L=2}, {S=10, L=3}, {S=3, L=10} and {S=6, L=7};

and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:

at least one time-domain scheduling parameter among {S=3, L=4}, {S=10, L=4}, {S=3, L=11}, {S=5, L=9}, {S=5, L=3}, {S=11, L=3} and {S=7, L=7}; or at least one time-domain scheduling parameter among {S=4, L=3}, {S=11, L=3}, {S=4, L=10}, {S=5, L=9}, {S=6, L=2}, {S=12, L=2} and {S=7, L=7}; or at least one time-domain scheduling parameter among {S=2, L=5}, {S=9, L=5}, {S=2, L=12}, {S=5, L=9}, {S=4, L=4}, {S=10, L=4} and {S=7, L=7};

and S is a start symbol of the data channel, and L is the number of symbols of the data channel.

In one embodiment, when a multiplexing relationship between the SSB and the broadcast control channel is using a frequency division multiplexing mode 2, the broadcast control channel monitoring occasion and the time-domain scheduling parameter of the data channel are configured as:

at least one time-domain scheduling parameter among {S=4, L=2}, {S=7, L=2}, {S=9, L=2}, {S=12, L=2}, {S=4, L=3}, {S=4, L=5}, {S=9, L=3} and {S=9, L=5};

and S is a start symbol of the data channel, and L is the number of symbols of the data channel.

In one embodiment, for the second configuration information, the SSB candidate position is configured as:

in a single-slot configuration, a first SSB candidate position: symbol number 4/5/6/7, and a second SSB candidate position: symbol number 8/9/10/11; or in a single-slot configuration, a first SSB candidate position: symbol number 2/3/4/5, and a second SSB candidate position: symbol number 6/7/8/9; or in a multi-slot configuration, a first SSB candidate position: symbol number 4/5/6/7, a second SSB candidate position: symbol number 8/9/10/11, a third SSB candidate position: symbol number 14/15/16/17, and a fourth SSB candidate position: symbol number 18/19/20/21; or in a single-slot configuration, a first SSB candidate position: symbol number 2/3/4/5, and a second SSB candidate position: symbol number 8/9/10/11.

In one embodiment, for the second configuration information, when a multiplexing relationship between the SSB and the broadcast control channel is using a frequency division multiplexing mode 3, the broadcast control channel monitoring occasion and the time-domain scheduling parameter of the data channel are configured as:

at least one time-domain scheduling parameter among {S=6, L=2}, {S=10, L=2}, {S=4, L=2}, {S=8, L=4}, {S=6, L=6} and {S=4, L=8}; or at least one time-domain scheduling parameter among {S=7, L=1}, {S=11, L=1}, {S=5, L=1}, {S=9, L=3}, {S=7, L=5} and {S=5, L=7}; or at least one time-domain scheduling parameter among {S=5, L=3}, {S=9, L=3}, {S=3, L=3}, {S=7, L=5}, {S=5, L=7} and {S=3, L=9};

and S is a start symbol of the data channel, and L is the number of symbols of the data channel.

In one embodiment, for the second configuration information, when a multiplexing relationship between the SSB and the broadcast control channel is using a time division multiplexing mode 1, the broadcast control channel monitoring occasion and the time-domain scheduling parameter of the data channel are configured as:

at least one time-domain scheduling parameter among {S=2, L=4}, {S=8, L=4}, {S=6, L=6} and {S=2, L=10}; or at least one time-domain scheduling parameter among {S=1, L=5}, {S=7, L=5}, {S=5, L=7} and {S=1, L=11};

and S is a start symbol of the data channel, and L is the number of symbols of the data channel.

In one embodiment, the device is a base station, the processor transmits the SSB and the broadcast control channel in the beam after the beam switching position or extended CP, including:

sending the SSB and the broadcast control channel in the beam after the beam switching position or extended CP according to the SSB candidate position and the broadcast control channel monitoring occasion;

sending the broadcast data in the data channel according to the broadcast control channel and the time-domain scheduling parameter.

In one embodiment, the device is a UE, the processor transmits the SSB and the broadcast control channel in the beam after the beam switching position or extended CP, including:

receiving the SSB and the broadcast control channel in the beam after the beam switching position or extended CP according to the SSB candidate position and the broadcast control channel monitoring occasion;

receiving the broadcast data in the data channel according to the broadcast control channel and the time-domain scheduling parameter.

One embodiment of the disclosure further provides an apparatus for broadcast data communication, including:

a configuration determining device configured to determine first configuration information containing a beam switching position, or determine second configuration information containing an extended CP, and the first configuration information/second configuration information includes a configured SSB candidate position, a broadcast control channel monitoring occasion, and a time-domain scheduling parameter of a data channel for receiving broadcast data;

a data transmission device configured to transmit an SSB and a broadcast control channel in a beam after the beam switching position or extended CP according to the first configuration information/second configuration information.

In one embodiment, the configuration determining device, for the first configuration information, configures the SSB candidate position as:
  each SSB candidate position occupies a fixed number of OFDM symbols, and SSB candidate positions of two adjacent SSBs are discontinuous.

In one embodiment, the configuration determining device, for the first configuration information, configures two beam switching positions in one slot in any one of following ways:
  a beam switching position of a first SSB in the slot is set at a first symbol of the slot, or a last symbol of a previous slot;
  a beam switching position of a second SSB in the slot is set at a symbol adjacent to a last symbol of the first SSB, or a previous symbol of a start symbol of the second SSB.

In one embodiment, the configuration determining device, for the first configuration information, configures the broadcast control channel monitoring occasion as any one of:
  a start symbol of a broadcast control channel corresponding to a first SSB in a slot is a first symbol after a beam switching position of the first SSB, or is in a position same as a position of a start symbol of the first SSB;
  a start symbol of a broadcast control channel corresponding to a second SSB in the slot is a first symbol after a beam switching position of the second SSB, or is in a position same as a position of a start symbol of the second SSB.

In one embodiment, the configuration determining device, for the first configuration information, configures the time-domain scheduling parameter of the data channel in a following way:
  the time-domain scheduling parameter of the data channel is related to the beam switching position; or
  the time-domain scheduling parameter of the data channel is related to an end symbol of the broadcast control channel monitoring occasion.

In one embodiment, the time-domain scheduling parameter of the data channel includes a start symbol and the number of symbols, and the time-domain scheduling parameter of the data channel is configured in a following way:
  the start symbol of the data channel ends with the beam switching symbol or begins with the beam switching symbol.

In one embodiment, the configuration determining device is further configured to:
  determine the beam switching position through indication information of the beam switching position defined by an interface protocol; or
  determine the beam switching position through the SSB candidate position, the broadcast control channel monitoring occasion, and the time-domain scheduling parameter of the data channel for receiving the broadcast data configured in the first configuration information.

In one embodiment, the configuration determining device determines the beam switching position by at least one of following steps:
  determining that a beam switching position of a first SSB in a slot is at a first symbol of the slot if a broadcast control channel corresponding to the first SSB in the slot is at a second symbol of the slot;
  determining that the beam switching position of the first SSB in the slot is at a last symbol of a previous slot if the broadcast control channel corresponding to the first SSB in the slot is at the first symbol of the slot;
  determining that a beam switching position of a second SSB is at a symbol adjacent to a last symbol of the first SSB if there is an interval of only one symbol between a start symbol of a broadcast control channel corresponding to the second SSB in the slot and the last symbol of the first SSB in the slot;
  determining that the beam switching position of the second SSB is at a previous symbol of a start symbol of the second SSB if a frequency division multiplexing mode is used for the broadcast control channel and the second SSB in the slot.

In one embodiment, when a multiplexing relationship between the SSB and the broadcast control channel is using a time division multiplexing mode 1, the broadcast control channel monitoring occasion and the time-domain scheduling parameter of the data channel are configured as:
  at least one time-domain scheduling parameter among {S=2, L=4}, {S=9, L=4}, {S=2, L=11} and {S=6, L=7}; or
  at least one time-domain scheduling parameter among {S=3, L=3}, {S=10, L=3}, {S=3, L=10} and {S=6, L=7}; or
  at least one time-domain scheduling parameter among {S=1, L=5}, {S=8, L=5}, {S=1, L=12} and {S=6, L=7};
  and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:
  at least one time-domain scheduling parameter among {S=4, L=2}, {S=7, L=2}, {S=11, L=2}, {S=4, L=9} and {S=6, L=7}; or
  at least one time-domain scheduling parameter among {S=5, L=1}, {S=7, L=2}, {S=12, L=1}, {S=5, L=8} and {S=6, L=7}; or
  at least one time-domain scheduling parameter among {S=3, L=3}, {S=7, L=2}, {S=10, L=3}, {S=3, L=10} and {S=6, L=7};
  and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:
  at least one time-domain scheduling parameter among {S=3, L=4}, {S=10, L=4}, {S=3, L=11}, {S=5, L=9}, {S=5, L=3}, {S=11, L=3} and {S=7, L=7}; or
  at least one time-domain scheduling parameter among {S=4, L=3}, {S=11, L=3}, {S=4, L=10}, {S=5, L=9}, {S=6, L=2}, {S=12, L=2} and {S=7, L=7}; or
  at least one time-domain scheduling parameter among {S=2, L=5}, {S=9, L=5}, {S=2, L=12}, {S=5, L=9}, {S=4, L=4}, {S=10, L=4} and {S=7, L=7};
  and S is a start symbol of the data channel, and L is the number of symbols of the data channel.

In one embodiment, when a multiplexing relationship between the SSB and the broadcast control channel is using a frequency division multiplexing mode 2, the broadcast control channel monitoring occasion and the time-domain scheduling parameter of the data channel are configured as:
  at least one time-domain scheduling parameter among {S=4, L=2}, {S=7, L=2}, {S=9, L=2}, {S=12, L=2}, {S=4, L=3}, {S=4, L=5}, {S=9, L=3} and {S=9, L=5};

and S is a start symbol of the data channel, and L is the number of symbols of the data channel.

In one embodiment, the configuration determining device, for the second configuration information, configures the SSB candidate position as:

in a single-slot configuration, a first SSB candidate position: symbol number 4/5/6/7, and a second SSB candidate position: symbol number 8/9/10/11; or in a single-slot configuration, a first SSB candidate position: symbol number 2/3/4/5, and a second SSB candidate position: symbol number 6/7/8/9; or in a multi-slot configuration, a first SSB candidate position: symbol number 4/5/6/7, a second SSB candidate position: symbol number 8/9/10/11, a third SSB candidate position: symbol number 14/15/16/17, and a fourth SSB candidate position: symbol number 18/19/20/21; or in a single-slot configuration, a first SSB candidate position: symbol number 2/3/4/5, and a second SSB candidate position: symbol number 8/9/10/11.

In one embodiment, for the second configuration information, the configuration determining device, when a multiplexing relationship between the SSB and the broadcast control channel is using a frequency division multiplexing mode 3, configures the broadcast control channel monitoring occasion and the time-domain scheduling parameter of the data channel as:

at least one time-domain scheduling parameter among {S=6, L=2}, {S=10, L=2}, {S=4, L=2}, {S=8, L=4}, {S=6, L=6} and {S=4, L=8}; or at least one time-domain scheduling parameter among {S=7, L=1}, {S=11, L=1}, {S=5, L=1}, {S=9, L=3}, {S=7, L=5} and {S=5, L=7}; or at least one time-domain scheduling parameter among {S=5, L=3}, {S=9, L=3}, {S=3, L=3}, {S=7, L=5}, {S=5, L=7} and {S=3, L=9};

and S is a start symbol of the data channel, and L is the number of symbols of the data channel.

In one embodiment, for the second configuration information, the configuration determining device, when a multiplexing relationship between the SSB and the broadcast control channel is using a time division multiplexing mode 1, configures the broadcast control channel monitoring occasion and the time-domain scheduling parameter of the data channel as:

at least one time-domain scheduling parameter among {S=2, L=4}, {S=8, L=4}, {S=6, L=6} and {S=2, L=10}; or at least one time-domain scheduling parameter among {S=1, L=5}, {S=7, L=5}, {S=5, L=7} and {S=1, L=11};

and S is a start symbol of the data channel, and L is the number of symbols of the data channel.

In one embodiment, the method is applied to a base station, transmitting the SSB and the broadcast control channel in the beam after the beam switching position or extended CP includes:

sending the SSB and the broadcast control channel in the beam after the beam switching position or extended CP according to the SSB candidate position and the broadcast control channel monitoring occasion;

sending the broadcast data in the data channel according to the broadcast control channel and the time-domain scheduling parameter.

In one embodiment, the method is applied to a UE, the data transmission device transmits the SSB and the broadcast control channel in the beam after the beam switching position or extended CP, including:

receiving the SSB and the broadcast control channel in the beam after the beam switching position or extended CP according to the SSB candidate position and the broadcast control channel monitoring occasion;

receiving the broadcast data in the data channel according to the broadcast control channel and the time-domain scheduling parameter.

One embodiment of the disclosure provides a computer program medium storing a computer program thereon, where the program, when executed by a processor, implements the steps of the method for broadcast data communication provided in the above embodiments.

According to the embodiments of the disclosure, there is provided a chip, which is coupled to a memory in a device, and the chip invokes program instructions stored in the memory when running, to implement the above various embodiments of the present application and any possible method involved in the various embodiments.

According to the embodiments of the disclosure, there is provided a computer program product which, when running on an electronic device, causes the electronic device to implement the above various embodiments of the present application and any possible method involved in the various embodiments.

The method, device and apparatus for broadcast data communication provided by the embodiments of the disclosure have the following beneficial effects.

In the disclosure, the design method based on the normal CP reserves the beam switching position when performing the broadcast data communication configuration, or the design method based on the extended CP solves the beam switching problem, and a solution for how to switch beams under higher SCS is given through the configuration of the SSB candidate position/the position of the broadcast control channel/the time-domain scheduling parameter of the data channel.

DETAILED DESCRIPTION OF THE EMBODIMENTS

The embodiments of the present application will be described clearly and completely below in combination with the accompanying drawings in the embodiments of the present application. The described embodiments are only a part of the embodiments of the present application but not all the embodiments.

In the following, some related terms in the embodiments of the disclosure are explained to facilitate the understanding.

1) SSB (Synchronous Signal Block).

Figure 1:
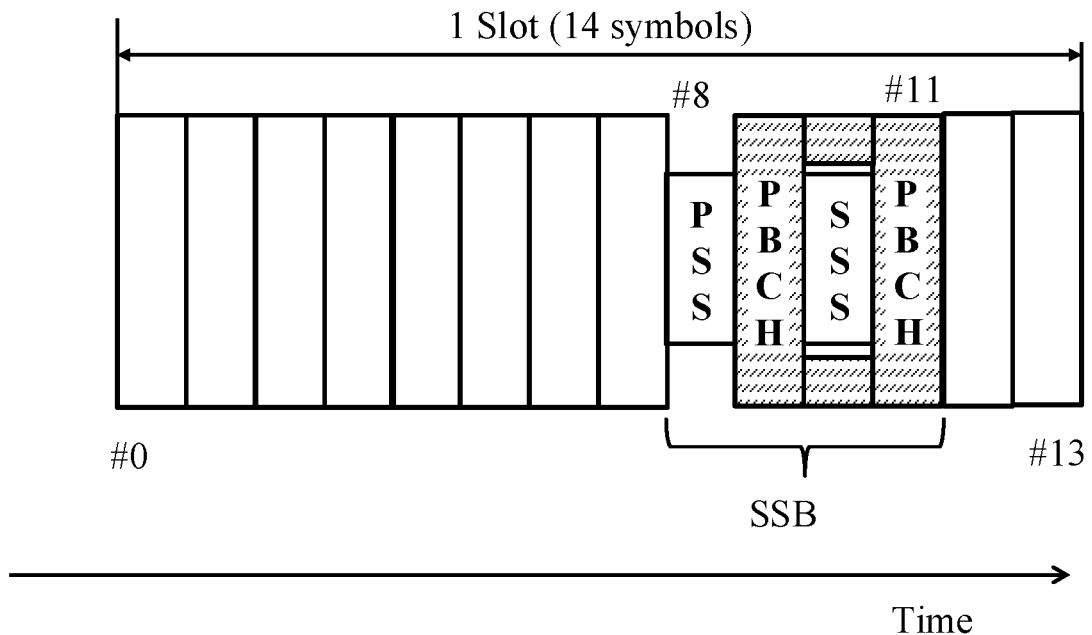
FIG. 1 is a schematic diagram of the SSB structure defined in the existing protocol.

As shown in FIG. 1, the SSB includes PSS (Primary Synchronous Signal)/SSS (Second Synchronous Signal)/PBCH (Physical Broadcast Channel). When a UE searches for a cell, the UE performs a synchronous search according to the PSS/SSS, and receives the PBCH or the basic system information sent by a base station after completing the synchronous search.

2) Candidate Position and Timing Information Sent by SSB.

The current NR standard defines the SSB transmission rule with SCS=15 KHz/30 KHz/120 KHz/240 KHz, and SCS=240 KHz is taken as an example for illustration.

When the SCS is 240 kHz, the position index of the first symbol sent by the SSB within a period of 5 ms is $\{8, 12, 16, 20, 32, 36, 40, 44\}+56 \cdot n$, where n=0, 1, 2, 3, 5, 6, 7, 8.

Figure 2:
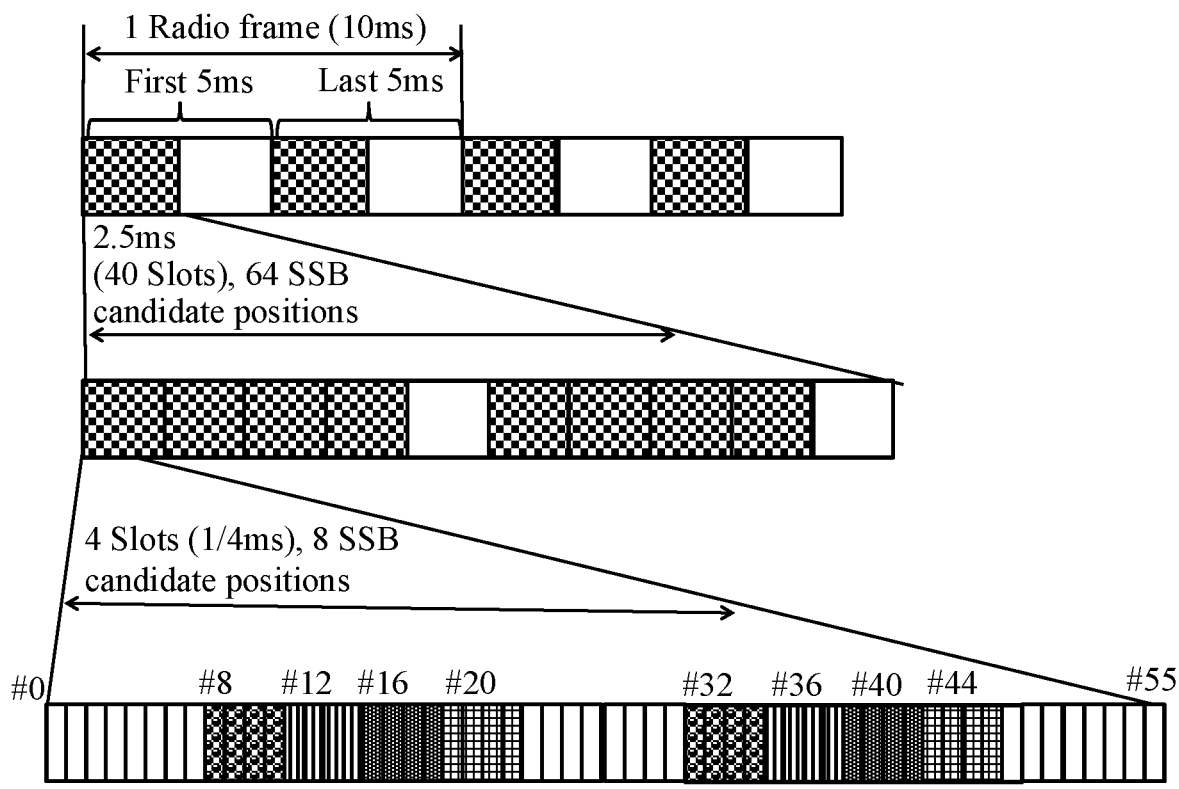
FIG. 2 is a schematic diagram of the corresponding SSB candidate positions when the SCS is 240 KHz in the prior art.

As shown in FIG. 2, when SCS=240 KHz, the designed sending period is 5 ms, and 64 SSB transmission candidate positions are supported, that is, the base station may send SSBs at a period of 5 ms, that is, send 64 SSBs every 5 ms.

3) Process of Terminal to Search for Cell and Receive Broadcast.

After the terminal is turned on, the terminal firstly searches for the PSS/SSS signal of the SSB for synchronization, and parses the PBCH in the SSB or the basic cell configuration information after obtaining the synchronization information; and the UE is further instructed in the PBCH to detect the broadcast control channel (standardly called: Type0-PDCCH) of the RMSI (Remain System Information), and the indication information includes the following content:

the CORESET information (Control Resource Set, indicating the number of resource block symbols and the number of Resource Blocks (RBs) of PDCCH) of the broadcast control channel that transmits the RMSI;

the search space (indicating where to detect the PDCCH) of the broadcast control channel that transmits the RMSI.

The terminal detects the corresponding PDSCH scheduling information according to the Type0-PDCCH indication information, and receives the PDSCH according to the scheduling information, and the scheduling information includes time-domain scheduling information, which is a default index table generated by the protocol.

Figure 3:
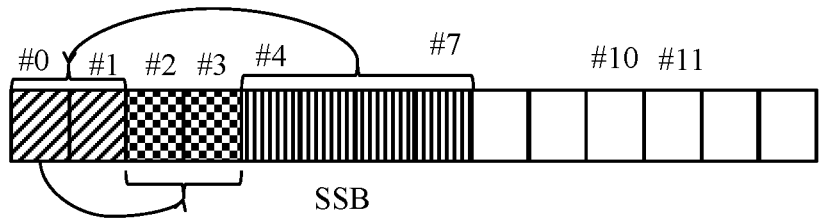
FIG. 3 is a schematic diagram of the SSB indicating the PDCCH and a PDCCH scheduling relationship in the prior art.
Figure 3:
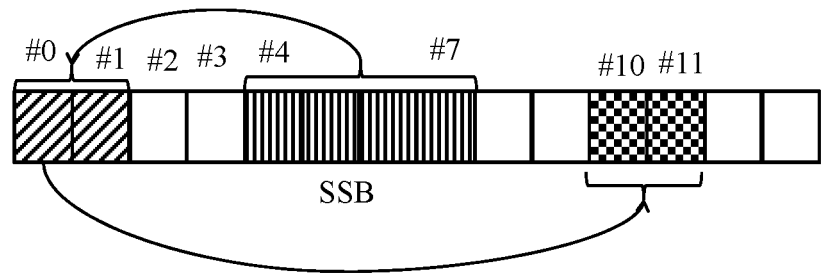

As shown in FIG. 3, it is assumed that the terminal searches an SSB, and obtains the Type0-PDCCH information from the PBCH information:

the PDCCH associated with the SSB occupies two OFDM symbols, and is located at symbol #0 and symbol #1.

The terminal detects the Type0-PDCCH and obtains the scheduling information of the PDSCH. The time-domain information index has two possible values: index=0, where it can be seen from the time-domain scheduling table of the PDSCH that the start symbol of the PDSCH is #2 and the length is 2 symbols; and index=1, where it can be seen from the time-domain scheduling table of the PDSCH that the start symbol of the PDSCH is #10 and the length is 2 symbols.

In order to solve the problem of large attenuation of high-frequency transmission, the beam sending technology will be used. The beam sending technology is to concentrate the antenna signal ability in one direction for sending through the multi-antenna forming technology, and the signal energy reaching the sending end is greatly enhanced. The amount of increase in signal strength depends on the directional gain of the antenna. The greater the directional gain of the antenna, the narrower the formed beam and the greater its ability to reach the receiving end.

Figure 4:
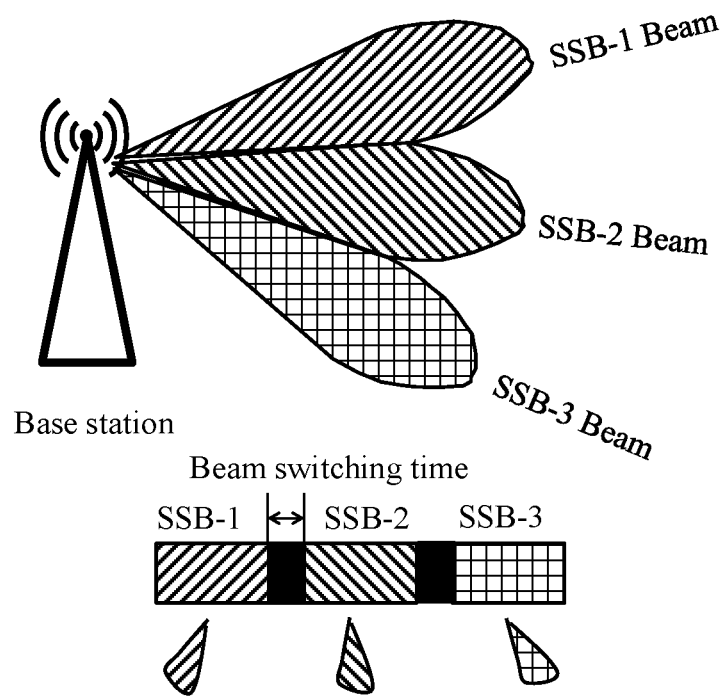
FIG. 4 is a schematic diagram of gains of signals arriving at the receiving end with different beams in the prior art.

As shown in FIG. 4, the base station uses different beams to send different SSBs. When switching from the SSB-1 beam to the SSB-2 beam, the switching time is required, where the length of the switching time depends on the capability of the device. Usually, the switching time may be considered as 150 ns-200 ns (nanoseconds); in the existing NR system, the SCS will not exceed 240 KHz, the CP (Cyclic Prefix) length is about 200 ns, and the base station and terminal device can use the CP for beam switching, so there is no problem of beam switching interval; but in the high frequency, the SCS may reach 960 KHz, and the CP length cannot meet the requirement of beam switching for the SCS greater than 480 KHz, so the special switching symbols need to be reserved for beam switching.

In the 5G OFDM system, the CP is used for beam switching to solve the problem of inter-symbol interference. The relationship between CP length and SCS is as shown in Table 1.

TABLE 1

Relationship between CP length and SCS

| u | SCS | CP length (us) | CP (length ns) |
|---|---|---|---|
| 3 | 120 KHz | 0.59 | 586 |
| 4 | 240K | 0.29 | 293 |
| 5 | 480K | 0.15 | 146 |
| 6 | 960K | 0.07 | 73 |

In the communication process, when the beam needs to be switched, the transceiver can neither send nor receive. This switching time is called switching GAP. The size of the switching GAP depends on the capability of the device, but the switching GAPs of most devices are generally between 150 nanoseconds and 200 nanoseconds. That is to say, when the SCS reaches 480 KHz or 960 KHz, the switching GAP is needed.

Figure 5:
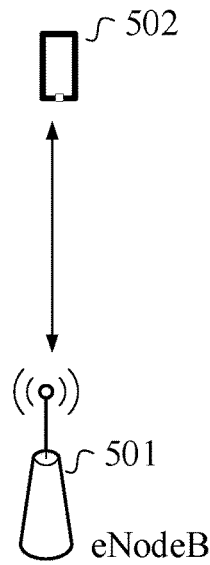
FIG. 5 is a schematic diagram of a system for broadcast data communication according to an embodiment of the disclosure.

Based on the above problem, an embodiment of the disclosure provides a system for broadcast data communication, as shown in FIG. 5, including:

a network device 501 configured to: determine the first configuration information of a beam switching position or use the second configuration information of an extended CP, where the first configuration information/second configuration information includes a configured SSB candidate position, a broadcast control channel monitoring occasion, and a time-domain scheduling parameter of a data channel for receiving broadcast data; and send an SSB and a broadcast control channel in a beam after the beam switching position or extended CP according to the first configuration information/second configuration information;

a User Equipment (UE) 502 configured to: determine the first configuration information of a beam switching position or use the second configuration information of an extended CP, where the first configuration information/second configuration information includes a configured SSB candidate position, a broadcast control channel monitoring occasion, and a time-domain scheduling parameter of a data channel for receiving broadcast data; and receive an SSB and a broadcast control channel in a beam after the beam switching position or extended CP according to the first configuration information/second configuration information.

The step of sending the SSB and broadcast control channel in the beam after the beam switching position or extended CP is specifically sending a useful SSB and broadcast control channel in the beam after the beam switching position or extended CP. Here, the above-mentioned "useful SSB and broadcast control channel" is illustrated: usually, the base station and the terminal need to execute the beam switching process at the determined beam switching position, and the data sending/receiving is interrupted during the beam switching process; due to considering different hardware capabilities, one of the base station and the terminal may complete the beam switching process in advance but still think that the received or sent signal is invalid or bad during the actual execution process, that is, this signal cannot be considered as a useful signal or channel.

The base station sends the useful SSB and broadcast control channel in the beam after the beam switching position or extended CP according to the SSB candidate position and the broadcast control channel monitoring occasion; and sends the broadcast data in the data channel according to the broadcast control channel and the time-domain scheduling parameter.

The UE receives the useful SSB and broadcast control channel in the beam after the beam switching position or extended CP according to the SSB candidate position and the broadcast control channel monitoring occasion; and receives the broadcast data in the data channel according to the broadcast control channel and the time-domain scheduling parameter.

The embodiment of the disclosure provides a solution for broadcast data communication. The design method based on the normal CP reserves the beam switching position when performing the broadcast data communication configuration, or the design method based on the extended CP solves the beam switching, and a solution for how to switch beams under higher SCS is given through the configuration of the SSB candidate position/the position of the broadcast control channel/the time-domain scheduling parameter of the data channel.

The broadcast data may be but not limited to RMSI data, the broadcast control channel may be but not limited to Type0-PDCCH, and the data channel may be but not limited to PDSCH channel.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The UE involved in the embodiments of the present application can refer to the device for providing the voice and/or data connectivity to the user, the handheld device with the wireless connection function, or other processing device connected to the wireless modem. In different systems, the terminal device may have different names. For example, in a 5G system, the terminal device may be referred to as User Equipment (UE). The wireless terminal device may communicate with one or more core networks via the Radio Access Network (RAN), and the wireless terminal device may be a mobile terminal, such as a mobile telephone (or called "cellular" telephone), and a computer with the mobile terminal, for example, may be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include multiple cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, and the rest of the access network may include IP networks. The network device may further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the embodiments.

Embodiment 1

Figure 6:
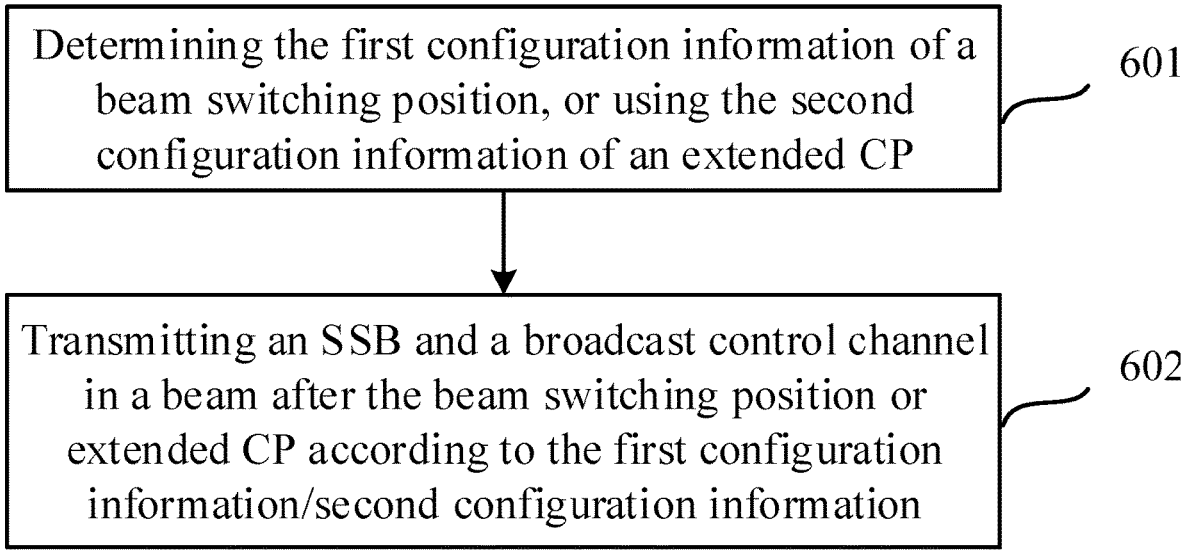
FIG. 6 is a flowchart of a method for broadcast data communication according to an embodiment of the disclosure.

An embodiment of the disclosure provides a method for broadcast data communication, as shown in FIG. 6, including:

Step 601: determining the first configuration information of a beam switching position, or using the second configuration information of an extended CP, where the first configuration information/second configuration information includes a configured SSB candidate position, a broadcast control channel monitoring occasion, and a time-domain scheduling parameter of a data channel for receiving broadcast data;

Step 602: transmitting an SSB and a broadcast control channel in a beam after the beam switching position or extended CP according to the first configuration information/second configuration information.

The embodiment of the disclosure provides two ways to solve beam switching, one of which is based on the normal CP design, where the beam switching position is reserved through the configuration information, and the beam switching position can be used for beam switching; and the other is to extend the normal CP and use the extended CP for beam switching. Further, the transmission configuration is performed on the broadcast data based on the beam switching position and the extended CP, where the SSB candidate position, the broadcast control channel monitoring occasion and the time-domain scheduling parameter of the data channel for receiving the broadcast data are configured, and the base station sends the broadcast data based on the transmission configuration information. If the beam switching is required, the beam switching is performed at the beam switching position or based on the extended CP, and the useful broadcast data is sent in the beam after the beam switching position or the extended CP. The UE receives the broadcast data based on the transmission configuration information. If the beam switching is required, the beam switching is completed before the beam switching position or before the extended CP, and the useful broadcast data is received in the beam after the beam switching position or the extended CP.

When this method is applied to a base stations, the base station sends the useful SSB and broadcast control channel in the beam after the beam switching position or extended CP according to the SSB candidate position and the broadcast control channel monitoring occasion; and sends the broadcast data in the data channel according to the broadcast control channel and the time-domain scheduling parameter.

When this method is applied to a UE, the UE receives the useful SSB and broadcast control channel in the beam after the beam switching position or extended CP according to the SSB candidate position and the broadcast control channel monitoring occasion; and receives the broadcast data in the data channel according to the broadcast control channel and the time-domain scheduling parameter.

The UE and base station determine the first configuration information/second configuration information as the configuration information defined by the interface protocol. The possible implementations of the first configuration information and the second configuration information will be illustrated below.

1. Reserve the First Configuration Information of the Beam Switching Position.

1) Configuration Mode of SSB Candidate Position and Beam Switching Position.

The SSB candidate position is configured as: each SSB candidate position occupies a fixed number of OFDM symbols, and SSB candidate positions of two adjacent SSBs are discontinuous.

Each SSB candidate position occupies a fixed number of OFDM symbols. When the value of the beam switching GAP over the CP length is greater than a threshold (e.g. exceeding the CP length by 100%), one or more symbols need to be used as the beam switching position, and the candidate positions of two adjacent SSBs are discontinuous. In this case, the beam switching is performed on the configured beam switching symbol. Accordingly, this symbol transmits no useful signal/data (e.g., no useful SSB, broadcast control channel or data channel). Since an integer number of symbols cannot transmit signals/data effectively, these symbols need to be deducted when designing the time-domain scheduling parameters of the PDSCH, and the beam switching symbol is used to represent a symbol in the slot where the beam switching is performed, and the beam switching symbol includes the beam switching time.

In one embodiment, each SSB candidate position occupies a fixed number of OFDM symbols. When the value of the beam switching GAP over the CP length is less than the threshold (e.g. exceeding the CP length by 50%), only a part of the time of one symbol is required as the beam switching position, and the candidate positions of two adjacent SSBs may be continuous. At this time, in order to avoid the influence of beam switching on the result of time synchronous calculation, the beam switching position is placed at the end of the last symbol of the SSB (such as the end of the fourth symbol (PBCH symbol) in the SSB). Correspondingly, the end part of this symbol transmits no valid signal/data (e.g., no useful SSB, broadcast control channel or data channel). Since a part of the symbol cannot transmit signals/data effectively, this symbol does not need to be deducted when the time-domain scheduling parameters of the PDSCH are designed.

During configuration, one, two or three SSB candidate positions may be configured in one slot, and each SSB candidate position occupies 4 OFDM symbols. The candidate positions of two adjacent SSBs in a slot are discontinuous, that is, the interval between them is greater than 1 symbol.

When configuring the beam switching positions of 2 SSBs in one slot, the following method may be used.

The switching time of the first SSB (called the first switching time for short) is set at the first symbol of the slot, or the last symbol of the previous slot.

The switching time of the second SSB (called the second switching time for short) is set at a symbol adjacent to the last symbol of the first SSB, or a previous symbol of the start symbol of the second SSB.

In one embodiment, the above reserved beam switching position in this embodiment may be explicitly indicated in the protocol, or the beam switching symbol may be implicitly indicated, specifically as follows.

Explicitly indicating the beam switching symbol: determining the beam switching position through the indication information of the beam switching position defined in the interface protocol, such as described as: the symbol number x is a beam switching symbol (x is an integer), the symbol number x is a reserved symbol, or described as "a symbol number x cannot be used to receive data or send signal/data", it is considered that the symbol number x may be used for the beam switching symbol of the SSB.

Implicitly indicating the beam switching symbol: determining the beam switching position through the SSB candidate position, the broadcast control channel monitoring occasion, and the time-domain scheduling parameter of the data channel for receiving the broadcast data configured in the first configuration information. For example, the position of the beam switching symbol is not defined, and only the candidate position of the SSB, the time-domain position of the Type0-PDCCH associated with the SSB, and the time-domain information of the PDSCH for scheduling the RMSI are defined. From these definitions, the base station/terminal can also deduce which symbols are used for SSB beam switching. In an embodiment, the beam switching position may be determined in any of the following ways:

- determining that the broadcast control channel corresponding to a first SSB in a slot is at a second symbol of the slot, and determining that the beam switching position of the first SSB in the slot is at a first symbol of the slot; for example, the Type0-PDCCH corresponding to the first SSB is on symbol 1 (or the second symbol) of slot n (n is an integer), and then it can be considered that the beam switching symbol is on the first symbol of slot n;
- determining that the broadcast control channel corresponding to the first SSB in the slot is at the first symbol of the slot, and determining that the beam switching position of the first SSB in the slot is at the last symbol of the previous slot; for example, the Type0-PDCCH corresponding to the first SSB is on symbol 0 of slot n, and then it can be considered that the beam switching symbol is on symbol 13 of slot (n−1) (or the last symbol of the previous slot);
- determining that there is an interval of only one symbol between the start symbol of the broadcast control channel corresponding to a second SSB in the slot and the last symbol of the first SSB in the slot, and determining that the beam switching position of the second SSB is at a symbol adjacent to the last symbol of the first SSB; for example, there is an interval of only one symbol between the start symbol of the Type0-PDCCH corresponding to the second SSB and the last symbol of the first SSB, and then it can be considered that the beam switching symbol is the symbol adjacent to the last symbol of the first SSB;
- determining that a frequency division multiplexing mode is used for the broadcast control channel and the second SSB in the slot, and determining that the switching time of the second SSB is at a previous symbol of a start symbol of the second SSB; for example, the frequency division multiplexing mode (mode 3) is used for the Type0-PDCCH and SSB, and then it can be considered that the beam switching symbol is the previous symbol of the start symbol of the second SSB.

2) Configuration Mode of Broadcast Control Channel Monitoring Occasion.

In one embodiment, the start symbol of the broadcast control channel corresponding to the first SSB in the slot is the first symbol after the beam switching position of the first SSB, or is the same in position as the start symbol of the first SSB. From the UE side, the SSB and corresponding Type0-PDCCH have the same beam characteristics, that is, no beam switching is required between the SSB and Type0-PDCCH.

The start symbol of the broadcast control channel corresponding to the second SSB in the slot is the first symbol after the beam switching position of the second SSB, or is the same in position as the start symbol of the second SSB. From the UE side, the SSB and corresponding Type0-PDCCH have the same beam characteristics, that is, no beam switching is required between the SSB and Type0-PDCCH.

3) Configuration Mode of Time-Domain Scheduling Parameter.

The parameters of the time-domain schedule table are related to the beam switching position such as the first switching time and the second switching time mentioned above, or related to the start symbol of the broadcast control channel and the number of symbols of the broadcast control channel, that is to say, to the end symbol of the broadcast control channel monitoring occasion.

The time-domain scheduling parameters of the data channel include the start symbol and the number of symbols. The start symbol of the data channel ends with the beam switching symbol or begins with the beam switching symbol, and the symbols occupied by the data channel cannot cross the beam switching symbol.

2. Use the Second Configuration Information of the Extended CP.

In the current NR technology, the extended CP is also supported in addition to the normal CP. The characteristics of the extended CP and normal CP are as follows.

Normal CP: there are a total of 14 OFDM symbols in one slot with a specific time length (such as 1 ms), each symbol length is about 66.67 microseconds, and the remaining time is allocated to 14 symbols as the CP.

Extended CP: there are a total of 12 OFMD symbols in one slot with a specific time length (such as 1 ms), each symbol length is about 66.67 microseconds, and the remaining time is allocated to 12 symbols as the CP.

In general, the extended CP is longer than the normal CP, and the specific values are shown in Table 2 below.

TABLE 2 lengths of normal CP and extended CP

| Index | SCS (Subcarrier Spacing) | Normal CP (nanosecond) | Extended CP (nanosecond) |
|---|---|---|---|
| 3 | 120 KHz | 586 | 2,083 |
| 4 | 240 KHz | 293 | 1,042 |
| 5 | 480 KHz | 146 | 521 |
| 6 | 960 KHz | 73 | 260 |

When the duration of beam switching is between 150 ns and 200 ns, the length of the extended CP is longer than the length of beam switching. Therefore, when the subcarrier span is greater than 240 KHz, the extended CP is selected to avoid the problem of beam switching symbol. The embodiments are described as follows.

1) Way to Configure the SSB Candidate Position.

Figure 7:
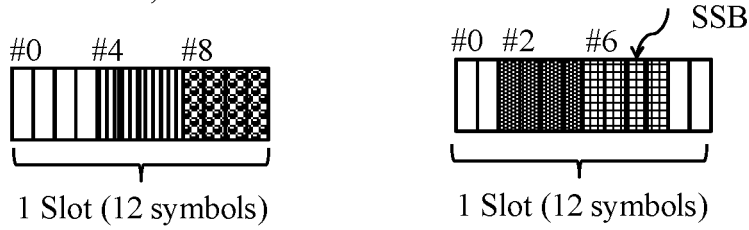
FIG. 7 is a schematic diagram of the SSB candidate position and beam switching position configured in the second way according to an embodiment of the disclosure.
Figure 7:
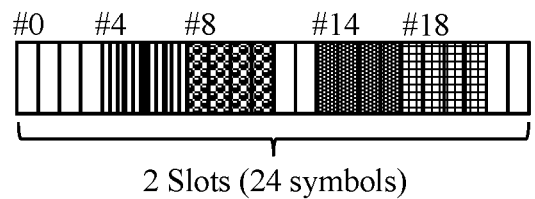
Figure 7:
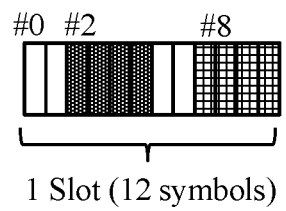

The SSB candidate positions are specified by protocol. For the extended CP slot, as shown in FIG. 7, the SSB candidate positions may include three types as follows.

1.1) Single-Slot Configuration: The SSBs in the Slot are Continuous.

The single-slot configuration here means that the protocol only specifies the position of one slot when configuring the symbol positions of the SSBs, and the same method is used for other slots. In one slot, the SSB position may have two options as follows:

the first SSB candidate position: symbol number 4/5/6/7, and the second SSB candidate position: symbol number 8/9/10/11;

the first SSB candidate position: symbol number 2/3/4/5, and the second SSB candidate position: symbol number 6/7/8/9.

In the single-slot configuration, the first SSB candidate position: symbol number 2/3/4/5, and the second SSB candidate position: symbol number 8/9/10/11.

1.2) Multi-Slot Configuration: The SSB Candidate Positions in a Slot are Continuous.

The multi-slot configuration here means that the protocol specifies the positions of multiple slots when configuring the symbol positions of the SSB candidate positions, and the same method is used for other multiple continuous slots. The multi-slot configuration may be combined in the same way as the single-slot configuration. In the multiple slots configured, the SSB candidate positions may be as follows.

The first SSB candidate position: symbol number 4/5/6/7, the second SSB candidate position: symbol number 8/9/10/11, the third SSB candidate position: symbol number 14/15/16/17, and the fourth SSB candidate position: symbol number 18/19/20/21.

1.3) Single-Slot Configuration: The SSBs in the Slot are Discontinuous.

The single-slot configuration here means that the protocol only specifies the position of one slot when configuring the symbol positions of the SSBs, and the same method is used for other slots. In one slot, discontinuous SSB candidate positions may be: the first SSB candidate position: symbol number 2/3/4/5; and the second SSB candidate position: symbol number 8/9/10/11.

2) Way to Configure the Broadcast Control Channel.

For the slot of the extended CP, the relationship between the broadcast control channel (Type0-PDCCH) and the SSB candidate position may be configured in two ways.

The start symbol of the broadcast control channel (Type0-PDCCH) corresponding to the SSB is aligned with the first symbol of the SSB, that is, the frequency division multiplexing mode (also called mode 3) is adopted.

The start symbol of the broadcast control channel (Type0-PDCCH) corresponding to the SSB is the start symbol of the slot, or the first symbol after the end symbol of the previous SSB candidate position, that is, the time division multiplexing mode (also called mode 1) is adopted.

3) Way to Configure the Time-Domain Scheduling Parameter Table of the Data Channel.

The start symbol of the PDSCH is the first symbol after the Type0-PDCCH, or the first symbol after the SSB corresponding to the Type0-PDCCH.

Taking the broadcast data being RMSI data, the broadcast control channel being Type0-PDCCH, and the data channel being PDSCH channel as an example, specific implementations of the two solutions to solve the beam switching problem will be given below.

Implementation 1.

In this embodiment, two SSB candidate positions are configured in a slot, the beam switching position (first switching time) of the first SSB in the slot is at the last symbol of the previous slot, and the beam switching position (second switching time) of the second SSB in the slot is at the symbol adjacent to the last symbol of the first SSB. The Type0-PDCCH of the first SSB is at the symbol after the first switching time, and the Type0-PDCCH of the second SSB is at the symbol after the second switching time.

In this embodiment, the RMSI transmission process specifically includes the following steps.

Step 1: determine the configured SSB candidate positions.

In this embodiment, one slot is configured to include two SSBs, and the SSB candidate positions and switching time positions are specifically as follows.

The beam switching position of the first SSB (called the first switching time for short) is set at the last symbol of the previous slot.

The beam switching position of the second SSB (called the second switching time for short) is set at a symbol adjacent to the last symbol of the first SSB.

Figure 8:
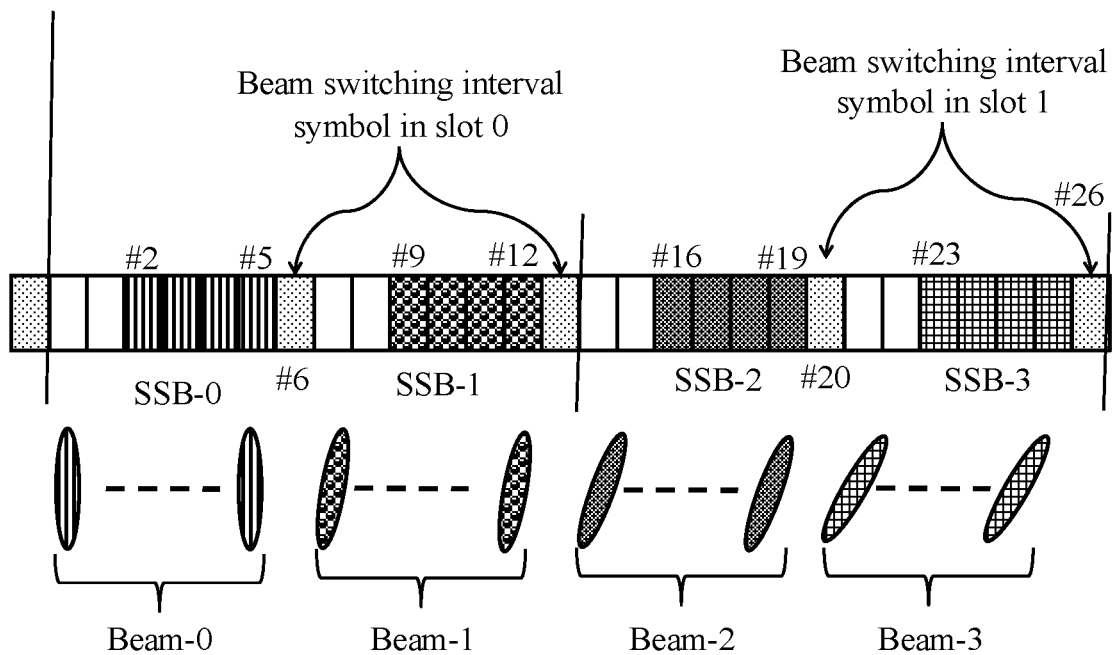
FIG. 8 is a schematic diagram of the SSB candidate position and beam switching position configured in an implementation 1 of the disclosure.

FIG. 8 is a schematic diagram of SSB candidate positions and beam switching positions. Before configuring the beam switching positions, the protocol needs to determine the SSB candidate positions. There are two SSB candidate positions in one slot. The candidate position of the first SSB (SSB0) is symbol 2/3/4/5. The candidate position of the second SSB (SSB1) is symbol 9/10/11/12.

The beam switching position of the SSB0 is on symbol 13 at the end of the slot before slot 0, and the beam switching position of the SSB1 is on symbol 6 of slot 0.

The beam switching position of the SSB2 is on symbol 13 at the end of slot 0, and the beam switching position of the SSB3 is on symbol 6 of slot 1 (corresponding to symbol 20 in the radio frame).

Step 2: determine the start position of the Type0-PDCCH monitoring occasion corresponding to the configured SSB, specifically as follows.

The start symbol of the Type0-PDCCH corresponding to the first SSB is: the first symbol after the first switching time. From the perspective of the UE, the SSB and the corresponding Type0-PDCCH have the same beam characteristics. That is, the beam switching is not required between the SSB and the Type0-PDCCH.

The start symbol of the Type0-PDCCH corresponding to the second SSB is: the first symbol after the second switching time. From the perspective of the UE, the SSB and the corresponding Type0-PDCCH have the same beam characteristics. That is, the beam switching is not required between the SSB and the Type0-PDCCH.

Figure 9:
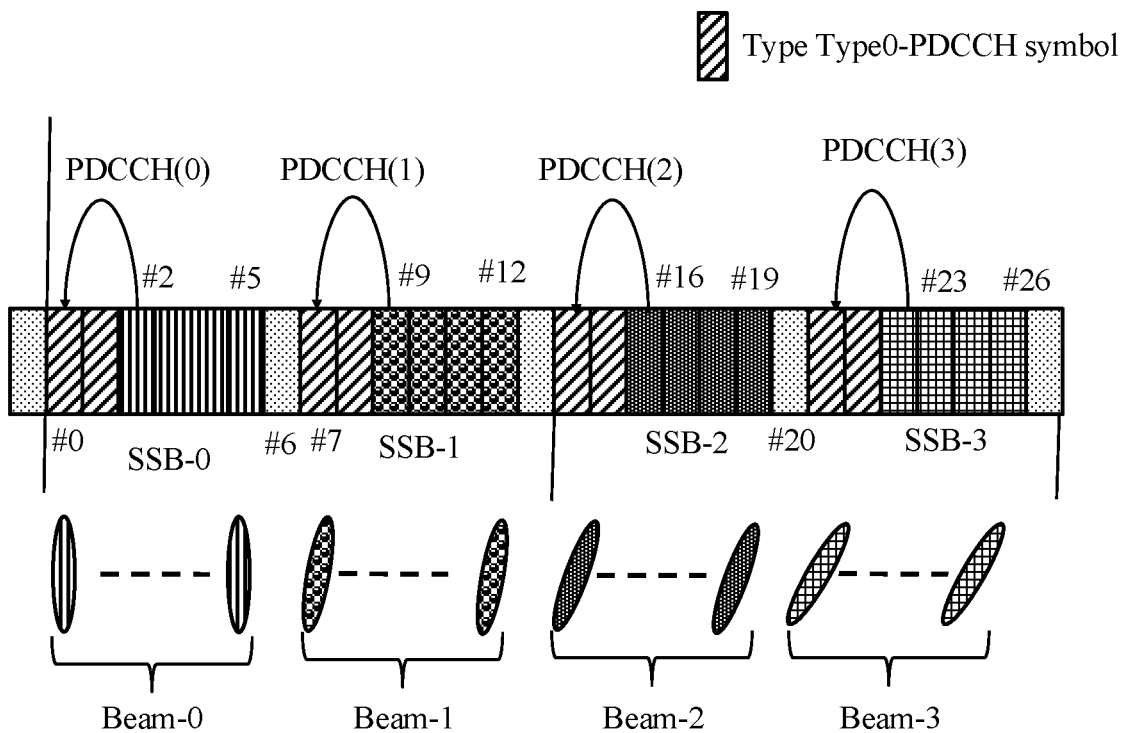
FIG. 9 is a schematic diagram of the position of the start symbol of the Type0-PDCCH corresponding to the SSB in the implementation 1 of the disclosure.

FIG. 9 is a schematic diagram of the start symbol position of the Type0-PDCCH corresponding to the SSB. The first symbol of the Type0-PDCCH corresponding to SSB-0 is on symbol #0, that is, located after the beam switching symbol of SSB-0. The first symbol of the Type0-PDCCH corresponding to SSB-1 is on symbol #7, that is, located after the beam switching symbol of SSB-1.

It should be noted that only the SSB candidate positions may be configured in Step 1, and the beam switching position corresponding to the SSB is determined implicitly by configuring the start position of the Type0-PDCCH. As shown in FIG. 9, there is an interval of one symbol (symbol 6) between the start position of Type0-PDCCH of SSB1 and the last symbol of SSB0, and then the symbol 6 is considered to be the beam switching symbol. Similarly, the start position of the Type0-PDCCH of SSB0 is symbol 0, and then the last symbol 13 of the previous slot is considered to be the beam switching symbol.

In this embodiment, when the time division multiplexing is used for the SSB and the Type0-PDCCH, the multiplexing relationship between SSB and Type0-PDCCH is mode 1.

Step 3: determine the configured time-domain scheduling parameters of the PDSCH for receiving the RMSI.

The parameters of the time-domain scheduling table are related to the first switching time and the second switching time, or related to the start position and the number of symbols of the Type0-PDCCH, that is to say, related to the end symbol of the Type0-PDCCH.

Figure 10:
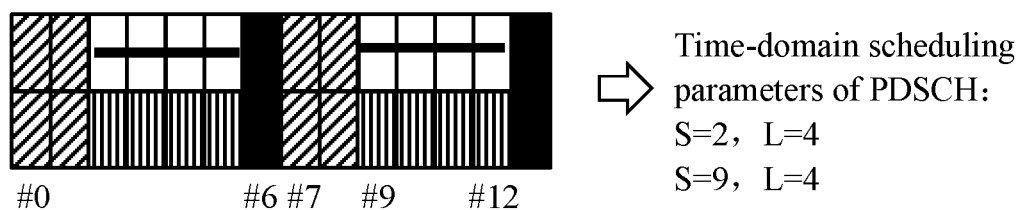
FIG. 10 is a schematic diagram of PDSCH time-domain scheduling configuration parameters of RMSI in the implementation 1 of the disclosure.
Figure 10:
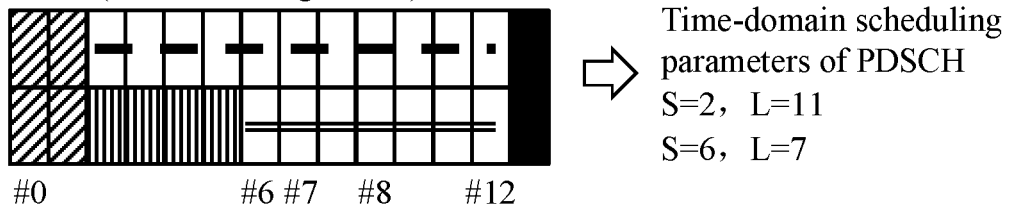

The time-domain scheduling timetable of the PDSCH in the slot with SSB is determined. As shown in FIG. 10, it is a schematic diagram of the time-domain scheduling parameters of the PDSCH of the RMSI (content associated with SSB). For a slot containing SSBs, there are two cases.

Case 1 (containing two SSBs): When one slot contains two SSBs, the scheduling data length cannot span the beam switching symbol, and can only end with the beam switching symbol or start after the beam switching. As shown in FIG. 10, assuming that the PDCCH occupies two symbols, the time-domain scheduling parameters of the PDSCH include: S=2, L=4; and S=9, L=4, where S represents the start symbol of the PDSCH, L represents the symbol length of the PDSCH.

Case 2 (containing one SSB): When one slot contains one SSB, the scheduling data length cannot span the beam switching symbol, and can only end with the beam switching symbol or start after the beam switching. As shown in FIG. 10, assuming that the PDCCH occupies two symbols, the time-domain scheduling parameters of the PDSCH include: S=2, L=11; and S=6, L=7.

To sum up, when the multiplexing relationship between SSB and Type0-PDCCH is mode 1 and the number of symbols of the PDCCH is 2, it is necessary to support the time-domain scheduling parameters of the PDSCH to include one or more of: {S=2, L=4}, {S=9, L=4}, {S=2, L=11}, {S=6, L=7}.

Further, by modifying the content of the existing protocol, the above time-domain resource allocation parameters are supported when there is a beam switching interval in the high frequency. As shown in Table 3, the existing table parameters are modified as follows.

TABLE 3

Default PDSCH time-domain resource allocation table A (Normal CP)

| Row index | dmrs-TypeA-Position | PDSCH mapping type | K0 | S | L | Remark |
|---|---|---|---|---|---|---|
| 1 | 2 | Type A | 0 | 2 | 11 | Newly-Added (note) |
|  |  |  | 0 | 2 | 12 |  |
|  | 3 | Type A | 0 | 3 | 11 |  |
| 2 | 2 | Type A | 0 | 2 | 10 |  |
|  | 3 | Type A | 0 | 3 | 9 |  |
| 3 | 2 | Type A | 0 | 2 | 9 |  |
|  | 3 | Type A | 0 | 3 | 8 |  |
| 4 | 2 | Type A | 0 | 2 | 7 |  |
|  | 3 | Type A | 0 | 3 | 6 |  |
| 5 | 2 | Type A | 0 | 2 | 5 |  |
|  | 3 | Type A | 0 | 3 | 4 |  |
| 6 | 2 | Type B | 0 | 9 | 4 | Reuse |
|  | 3 | Type B | 0 | 10 | 4 |  |
| 7 | 2 | Type B | 0 | 4 | 4 |  |
|  | 3 | Type B | 0 | 6 | 4 |  |
| 8 |  | Type B | 0 | 5 | 7 |  |
|  | 2, 3 |  | 0 | 6 | 7 | Newly-Added (note) |
| 9 | 2, 3 | Type B | 0 | 5 | 2 |  |
| 10 | 2, 3 | Type B | 0 | 9 | 2 |  |
| 11 | 2, 3 | Type B | 0 | 12 | 2 |  |
| 12 | 2, 3 | Type A | 0 | 1 | 13 |  |
| 13 | 2, 3 | Type A | 0 | 1 | 6 |  |
| 14 | 2, 3 | Type A | 0 | 2 | 4 | Reuse |
| 15 | 2, 3 | Type B | 0 | 4 | 7 |  |
| 16 | 2, 3 | Type B | 0 | 8 | 4 |  |

In the above PDSCH time-domain resource allocation table, the time-domain parameters of the PDSCH during beam switching are formulated. The annotation meaning of the above note is: when the SSB configured by the base station requires a beam switching interval, it corresponds to the row index value, and the parameters with note are scheduled. Otherwise, the parameters in another row are scheduled. For example: when row index=8, if the SSB configured by the base station requires beam switching, the scheduling parameters are S=6, L=7; otherwise, S=5, L=7.

The above is the method of determining the time-domain scheduling parameters of the PDSCH when the number of symbols of the PDCCH is 2. The same method can be applied to the cases where the number of symbols of the PDCCH is 1 and the number of symbols of the PDSCH is 3, to determine the corresponding time-domain scheduling parameters of the PDCCH, specifically as follows.

When the multiplexing relationship between SSB and Type0-PDCCH is mode 1 and the number of symbols of the PDCCH is 3, it is necessary to support the time-domain scheduling parameters of the PDSCH to include one or more of: {S=3, L=3}, {S=10, L=3}, {S=3, L=10}, {S=6, L=7}.

When the multiplexing relationship between SSB and Type0-PDCCH is mode 1 and the number of symbols of the PDCCH is 1, it is necessary to support the time-domain scheduling parameters of the PDSCH to include one or more of: {S=1, L=5}, {S=8, L=5}, {S=1, L=12}, {S=6, L=7}.

Step 4: the UE terminal detects and receives the RMSI information according to the above configuration information, mainly including the following process.

Firstly, the SSB is searched, the corresponding PBCH is parsed, and the Type0-PDCCH is detected according to the parsed-out configuration information of the Type0-PDCCH.

The RMSI is received according to the scheduling information of the Type0-PDCCH and the parameter information of the time-domain scheduling table of the PDSCH of the RMSI.

The RMSI here can also be called SIB1 (System Information Block 1) in the protocol, and is used for scrambling the SI-RNTI, and the data scheduled by the scheduling information is detected on the Type0-PDCCH in the search space.

Implementation 2.

In this embodiment, two SSB candidate positions are configured in a slot, the beam switching position (first switching time) of the first SSB in the slot is at the last symbol of the previous slot, and the beam switching position (second switching time) of the second SSB in the slot is at the symbol adjacent to the last symbol of the first SSB. The start symbol of the Type0-PDCCH of the first SSB is aligned with the start symbol of the first SSB, and the start symbol of the Type0-PDCCH of the second SSB is aligned with the start symbol of the second SSB.

In this embodiment, the RMSI transmission process specifically includes the following steps.

Step 1: determine the SSB candidate positions and switching time positions.

The switching time of the first SSB (called the first switching time for short) is set at the last symbol of the previous slot.

Figure 11:
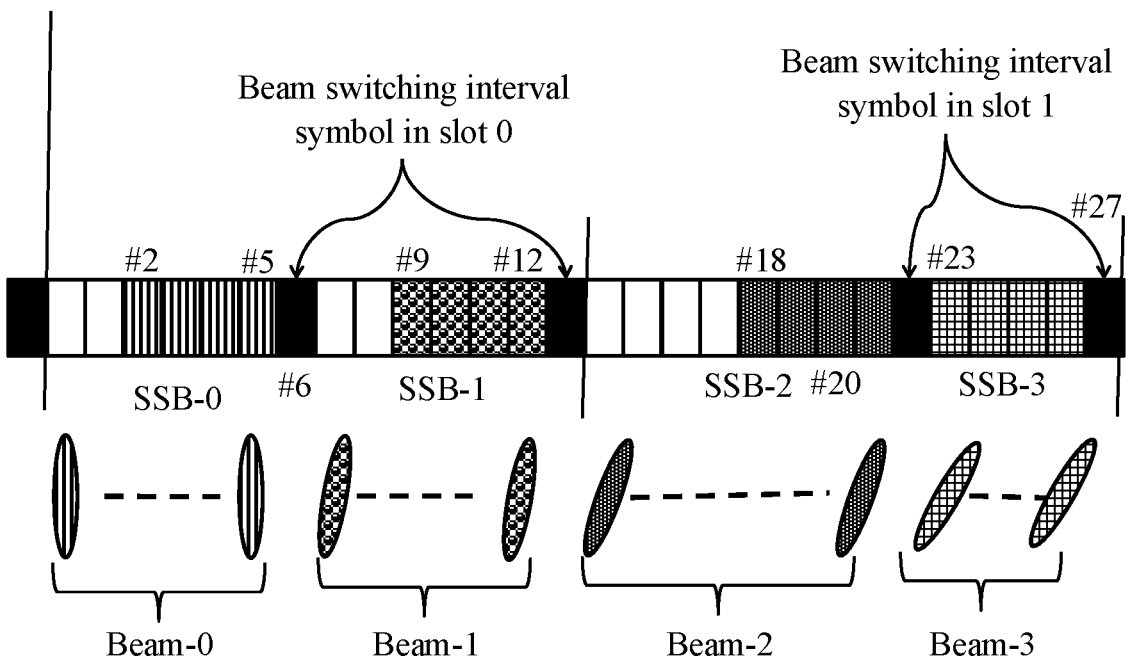
FIG. 11 is a schematic diagram of the SSB candidate position and beam switching position configured in an implementation 2 of the disclosure.

The switching time of the second SSB (called the second switching time for short) is set at a symbol adjacent to the last symbol of the first SSB. FIG. 11 is a schematic diagram of SSB candidate positions and switching time positions. Before configuring the beam switching positions, the protocol needs to determine the SSB candidate positions. In this embodiment, the SSB candidate positions configured in two adjacent slots are different.

Candidate positions of SSBs in slot 0: the candidate position of the first SSB (SSB0) is symbol 2/3/4/5. The candidate position of the second SSB (SSB1) is symbol 9/10/11/12. Correspondingly: the beam switching position of the SSB0 is on symbol 13 of the slot before slot 0, and the beam switching position of the SSB1 is on symbol 6 of slot 0.

Candidate positions of SSBs in slot 1: the candidate position of the first SSB (SSB2) is symbol 4/5/6/7 (the symbol number counted in radio frame is: 18/19/20/21). The candidate position of the second SSB (SSB3) is symbol 9/10/11/12 (the symbol number counted in radio frame is: 23/24/25/26). Correspondingly: the beam switching position of the SSB2 is on symbol 13 of the slot before slot 1, and the beam switching position of the SSB1 is on symbol 8 of slot 1.

Step 2: determine the start position of the Type0-PDCCH monitoring occasion corresponding to the configured SSB.

The start symbol of the Type0-PDCCH corresponding to the first SSB is: aligned with the first symbol of the first SSB. From the perspective of the UE, the SSB and the corresponding Type0-PDCCH have the same beam characteristics. That is, the beam switching is not required between the SSB and the Type0-PDCCH.

The start symbol of the Type0-PDCCH corresponding to the second SSB is: aligned with the first symbol of the second SSB. From the perspective of the UE, the SSB and the corresponding Type0-PDCCH have the same beam characteristics. That is, the beam switching is not required between the SSB and the Type0-PDCCH.

Figure 12:
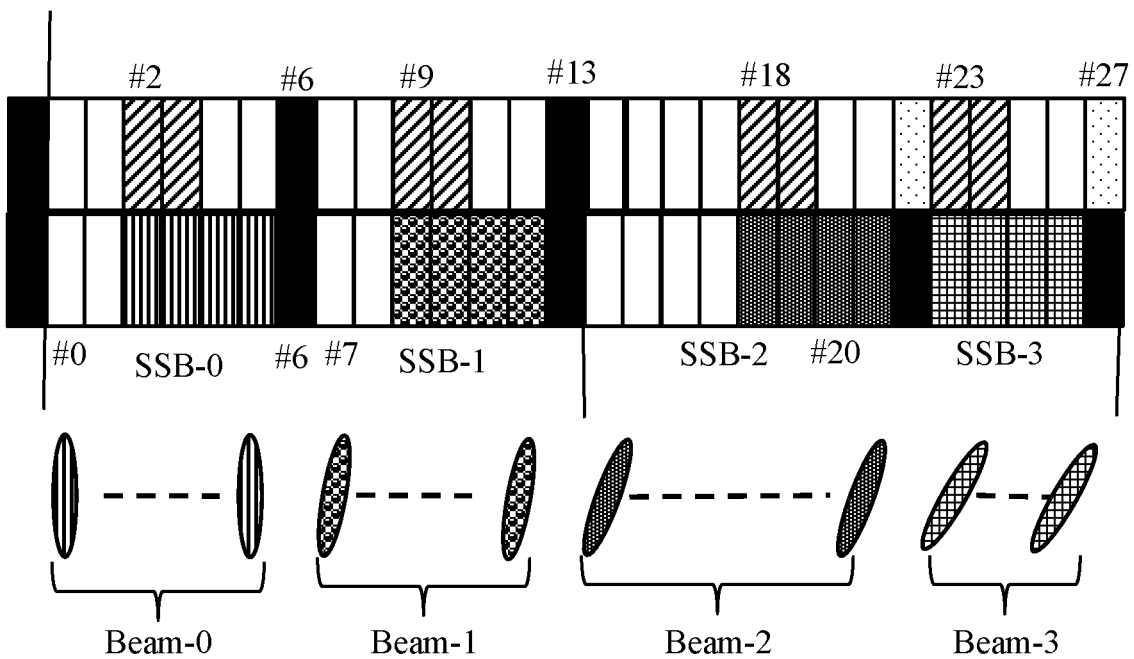
FIG. 12 is a schematic diagram of the position of the start symbol of the Type0-PDCCH corresponding to the SSB in the implementation 2 of the disclosure.

As shown in FIG. 12, it is a schematic diagram of the start symbol position of the Type0-PDCCH corresponding to the SSB. The start symbol of Type0-PDCCH corresponding to SSB-0 is #2; the start symbol of Type0-PDCCH corresponding to SSB-1 is #9; the start symbol of Type0-PDCCH corresponding to SSB-2 is #18; and the start symbol of Type0-PDCCH corresponding to SSB-3 is #23.

Step 3: determine the configured time-domain scheduling parameters of the PDSCH for receiving the RMSI.

The parameters of the time-domain scheduling table are related to the first switching time and the second switching time, or related to the start position and the number of symbols of the Type0-PDCCH, that is to say, related to the end symbol of the Type0-PDCCH. The start symbol of the PDSCH is a symbol after the end symbol of the Type0-PDCCH.

Figure 13:
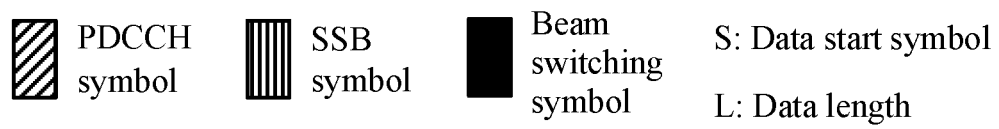
FIG. 13 is a schematic diagram of PDSCH time-domain scheduling configuration parameters of RMSI in the implementation 2 of the disclosure.
Figure 13:
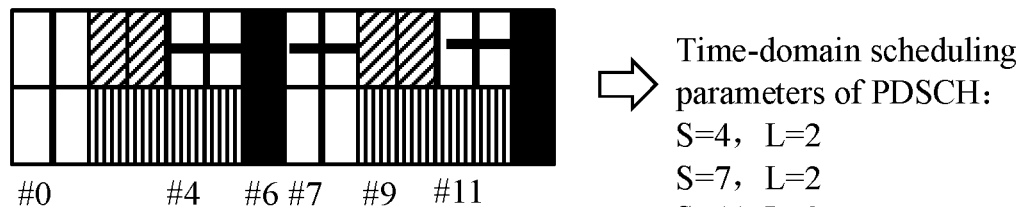
Figure 13:
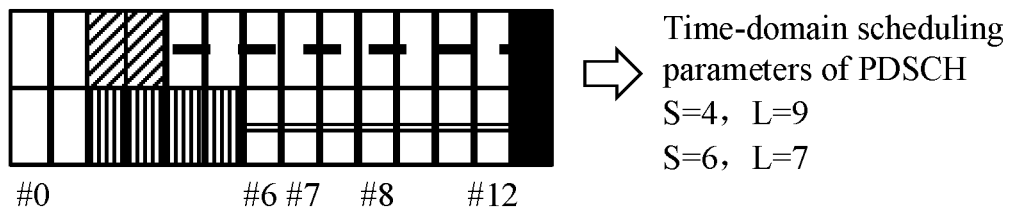

The time-domain scheduling configuration parameters of the PDSCH in the slot with SSB are determined. As shown in FIG. 13, for a slot containing SSBs, there are two cases.

Case 1 (containing two SSBs): When one slot contains two SSBs, the scheduling data length cannot span the beam switching symbol, and can only end with the beam switching symbol or start after the beam switching. As shown in FIG. 13, assuming that the PDCCH occupies two symbols, the time-domain scheduling parameters of the PDSCH include: {S=4, L=2}, {S=7, L=2}, {S=11, L=2}.

Case 2 (containing one SSB): When one slot contains one SSB, the scheduling data length cannot span the beam switching symbol, and can only end with the beam switching symbol or start after the beam switching. As shown in FIG. 13, assuming that the PDCCH occupies two symbols, the time-domain scheduling parameters of the PDSCH include: {S=4, L=9}, {S=6, L=7}.

In this embodiment, the frequency division multiplexing relationship between SSB and Type0-PDCCH is called mode 3. When the frequency division multiplexing relationship between SSB and Type0-PDCCH is mode 3 and the number of symbols of the PDCCH is 2, it is necessary to support the time-domain scheduling parameters of the PDSCH to include one or more of: {S=4, L=2}, {S=7, L=2}, {S=11, L=2}, {S=4, L=9}, {S=6, L=7}.

Further, by modifying the content of the existing protocol, the above time-domain resource allocation parameters are supported when there is a beam switching interval in the high frequency. The table parameters of the existing protocol are modified to obtain the following PDSCH time-domain resource allocation table.

TABLE 4

Default PDSCH time-domain resource allocation table C (Normal CP)

| Row index | dmrs-TypeA-Position | PDSCH mapping type | K0 | S | L | Remark |
|---|---|---|---|---|---|---|
| 1 (Note 1) | 2, 3 | Type B | 0 | 2 | 2 | |
| 2 | 2, 3 | Type B | 0 | 4 | 2 | Reuse |
| 3 | 2, 3 | Type B | 0 | 6 | 2 | |
| | | | 0 | 7 | 2 | note |
| 4 | 2, 3 | Type B | 0 | 8 | 2 | |
| 5 | 2, 3 | Type B | 0 | 10 | 2 | |
| | 2, 3 | Type B | 0 | 11 | 2 | note |
| 6 | Reserved | Reserved | Reserved | Reserved | Reserved | |
| | 2, 3 | Type B | 0 | 4 | 9 | note |
| 7 | Reserved | Reserved | Reserved | Reserved | Reserved | |
| | | | 0 | 6 | 7 | note |
| 8 | 2, 3 | Type B | 0 | 2 | 4 | |
| 9 | 2, 3 | Type B | 0 | 4 | 4 | |
| 10 | 2, 3 | Type B | 0 | 6 | 4 | |
| 11 | 2, 3 | Type B | 0 | 8 | 4 | |
| 12 | 2, 3 | Type B | 0 | 10 | 4 | |
| 13 | 2, 3 | Type B | 0 | 2 | 7 | |
| 14 | 2 | Type A | 0 | 2 | 12 | |

TABLE 4-continued

Default PDSCH time-domain resource allocation table C (Normal CP)

| Row index | dmrs-TypeA-Position | PDSCH mapping type | K0 | S | L | Remark |
|---|---|---|---|---|---|---|
|  | 3 | Type A | 0 | 3 | 11 |  |
| 15 | 2, 3 | Type A | 0 | 0 | 6 |  |
| 16 | 2, 3 | Type A | 0 | 2 | 6 |  |

In the above PDSCH time-domain resource allocation table, the time-domain parameters during beam switching are formulated. The annotation meaning of the above note is: when the SSB configured by the base station requires a beam switching interval, it corresponds to the row index value, and the parameters with note are scheduled. Otherwise, the parameters in another row are scheduled.

It should be noted that the reserved items in the existing parameter table are preferentially selected when new scheduling time-domain parameters are added to the above table, to minimize the amount of modification to the existing protocol.

For example: when row index=5, if the SSB configured by the base station requires beam switching, the scheduling parameters are S=11, L=2; otherwise, S=10, L=2.

For example: when row index=6, if the SSB configured by the base station requires beam switching, the scheduling parameters are S=4, L=9; otherwise, the scheduling is considered invalid.

The above is the method of determining the time-domain scheduling parameters of the PDSCH when the number of symbols of the PDCCH is 2. The same method can be applied to the cases where the number of symbols of the PDCCH is 1 and the number of symbols of the PDCCH is 3, to determine the corresponding time-domain scheduling parameters of the PDCCH, specifically as follows.

When the multiplexing relationship between SSB and Type0-PDCCH is mode 3 and the number of symbols of the PDCCH is 3, it is necessary to support the time-domain scheduling parameters of the PDSCH to include one or more of: {S=5, L=1}, {S=7, L=2}, {S=12, L=1}, {S=5, L=8}, {S=6, L=7}.

When the multiplexing relationship between SSB and Type0-PDCCH is mode 3 and the number of symbols of the PDCCH is 1, it is necessary to support the time-domain scheduling parameters of the PDSCH to include one or more of: {S=3, L=3}, {S=7, L=2}, {S=10, L=3}, {S=3, L=10}, {S=6, L=7}.

Step 4: the terminal detects and receives the RMSI information according to the above configuration information, where the main process is as follows.

Firstly, the SSB is searched, the corresponding PBCH is parsed, and the Type0-PDCCH is detected according to the parsing result.

The RMSI is received according to the scheduling information of the Type0-PDCCH and the parameter information of the time-domain scheduling table of the PDSCH of the RMSI.

The RMSI here can also be called SIB1 (System Information Block 1) in the protocol, and is used for scrambling the SI-RNTI, and the data scheduled by the scheduling information is detected on the Type0-PDCCH in the search space.

Implementation 3.

In this embodiment, there are two SSB candidate positions in one slot, the first switching time is before the start symbol of the first SSB, and the second switching time is before the start symbol of the second SSB. The start symbol of the Type0-PDCCH corresponding to the first SSB is aligned with the start symbol of the first SSB, and the start symbol of the Type0-PDCCH corresponding to the second SSB is aligned with the start symbol of the second SSB.

In this embodiment, the RMSI transmission process is mainly as follows.

Step 1: determine the configured SSB candidate positions and switching time positions.

In this embodiment, the SSB candidate positions and switching time positions configured in one slot are as follows.

The switching time of the first SSB (called the first switching time for short) is set at the previous symbol of the SSB start symbol.

The switching time of the second SSB (called the second switching time for short) is set at the previous symbol of the SSB start symbol.

Figure 14:
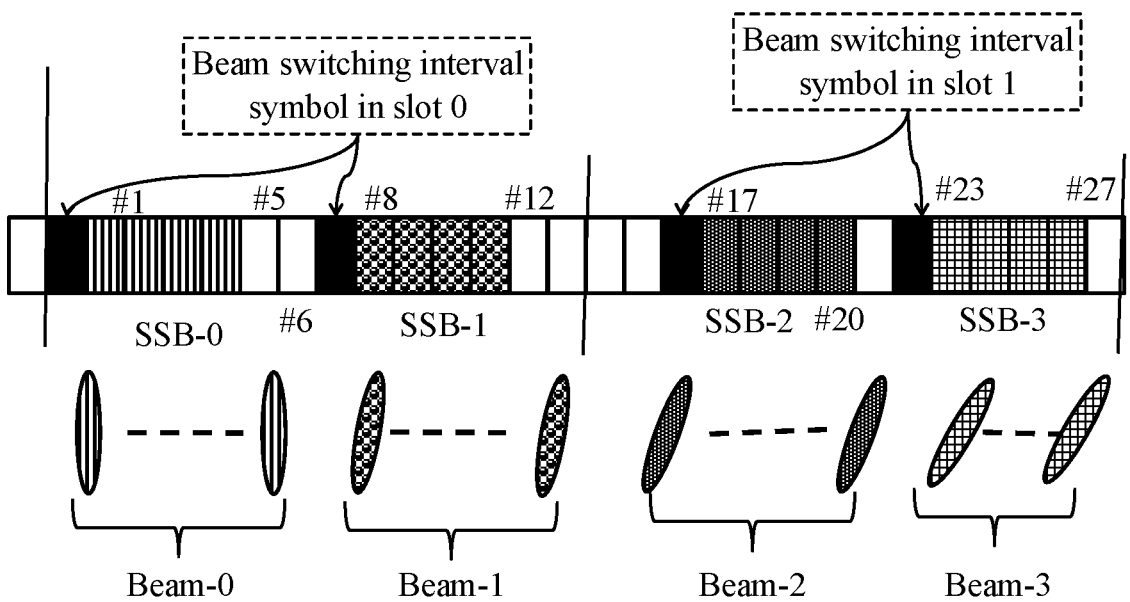
FIG. 14 is a schematic diagram of the SSB candidate position and beam switching position configured in an implementation 3 of the disclosure.

FIG. 14 is a schematic diagram of the beam switching positions of SSBs. Before configuring the beam switching positions, the protocol needs to determine the SSB candidate positions. The SSB candidate positions configured in two adjacent slots are different.

Candidate positions of SSBs in slot 0: the candidate position of the first SSB (SSB0) is symbol 1/2/3/4. The candidate position of the second SSB (SSB1) is symbol 8/9/10/11. Correspondingly: the beam switching position of the SSB0 is on symbol 0, and the beam switching position of the SSB1 is on symbol 7 of slot n.

Candidate positions of SSBs in slot 1: the candidate position of the first SSB (SSB2) is symbol 3/4/5/6 (the symbol number counted in radio frame is: 17/18/19/20). The candidate position of the second SSB (SSB3) is symbol 9/10/11/12 (the symbol number counted in radio frame is: 23/24/25/26). Correspondingly: the beam switching position of the SSB2 is on symbol 2 of slot 1, and the beam switching position of the SSB1 is on symbol 8 of slot 1.

Step 2: determine the start position of the Type0-PDCCH monitoring occasion corresponding to the configured SSB.

The start symbol of the Type0-PDCCH corresponding to the first SSB is: aligned with the first symbol of the SSB. From the perspective of the UE, the SSB and the corresponding Type0-PDCCH have the same beam characteristics. That is, the beam switching is not required between the SSB and the Type0-PDCCH.

The start symbol of the Type0-PDCCH corresponding to the second SSB is: aligned with the first symbol of the SSB. From the perspective of the UE, the SSB and the corresponding Type0-PDCCH have the same beam characteristics. That is, the beam switching is not required between the SSB and the Type0-PDCCH.

Figure 15:
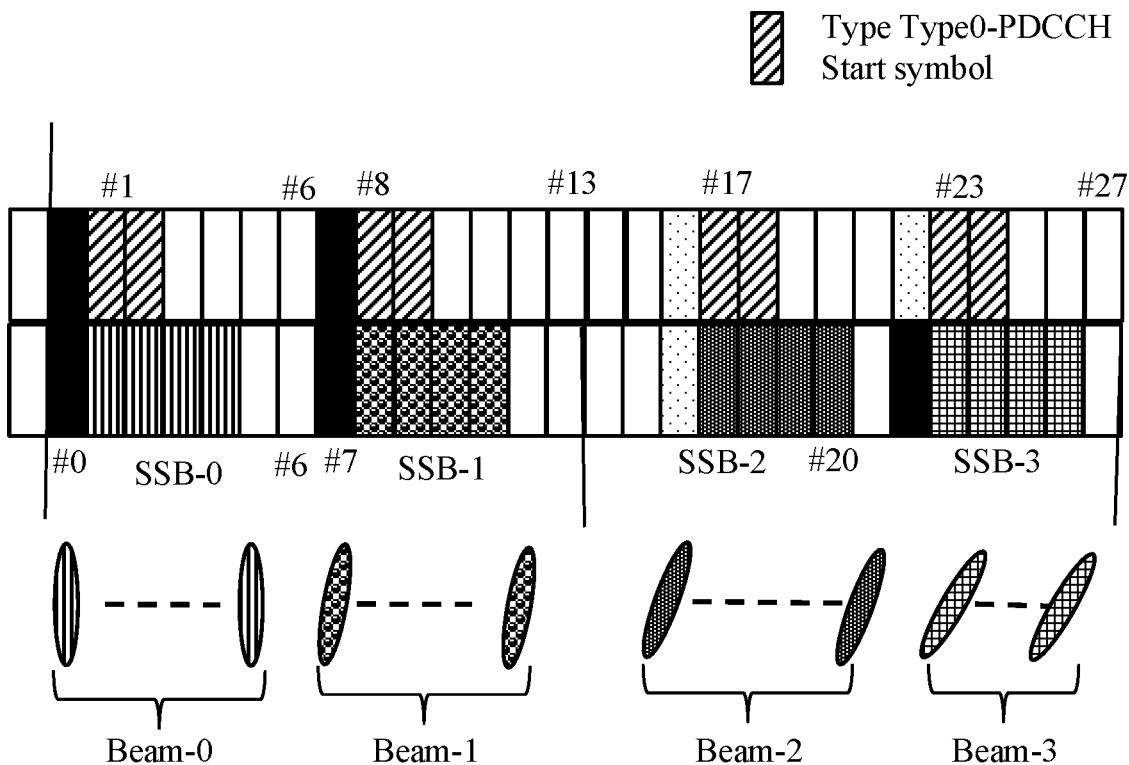
FIG. 15 is a schematic diagram of the position of the start symbol of the Type0-PDCCH corresponding to the SSB in the implementation 3 of the disclosure.

As shown in FIG. 15, it is a schematic diagram of the start symbol position of the Type0-PDCCH corresponding to the SSB. The start symbol of Type0-PDCCH corresponding to SSB-0 is #1; the start symbol of Type0-PDCCH corresponding to SSB-1 is #8; the start symbol of Type0-PDCCH corresponding to SSB-2 is #17; and the start symbol of Type0-PDCCH corresponding to SSB-3 is #23.

Step 3: determine the configured time-domain scheduling parameters of the PDSCH of the RMSI.

The parameters of the time-domain scheduling table are related to the first switching time and the second switching time, or related to the start position and the number of symbols of the Type0-PDCCH, that is to say, related to the end symbol of the Type0-PDCCH.

Figure 16:
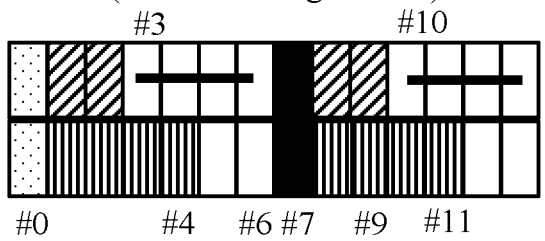
FIG. 16 is a schematic diagram of PDSCH time-domain scheduling configuration parameters of RMSI of one slot in the implementation 3 of the disclosure.
Figure 16:
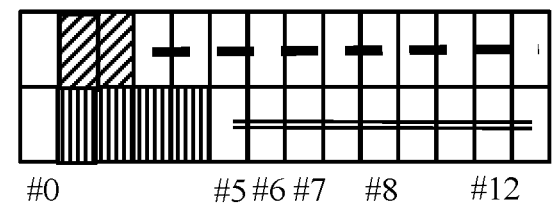

The time-domain scheduling configuration parameters of the PDSCH in the slot with SSB are determined. As shown in FIG. 16, it is a schematic diagram of the time-domain scheduling parameters of the PDSCH of the RMSI configured for one of slots. For a slot containing SSBs, there are two cases.

Case 1 (containing two SSBs): When one slot contains two SSBs, the scheduling data length cannot span the beam switching symbol, and can only end with the beam switching symbol or start after the beam switching. As shown in FIG. 16, assuming that the PDCCH occupies two symbols, the time-domain scheduling parameters of the PDSCH include: {S=3, L=4}; {S=10, L=4}.

Case 2 (containing one SSB): When one slot contains one SSB, the scheduling data length cannot span the beam switching symbol, and can only end with the beam switching symbol or start after the beam switching. As shown in FIG. 16, assuming that the PDCCH occupies two symbols, the time-domain scheduling parameters of the PDSCH include: {S=3, L=11}; {S=5, L=9}.

Figure 17:
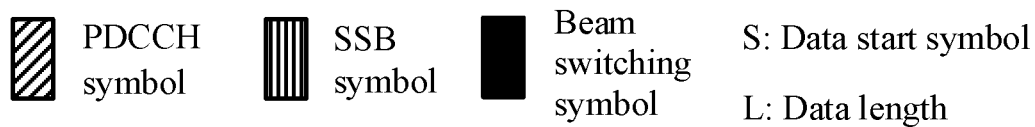
FIG. 17 is a schematic diagram of PDSCH time-domain scheduling configuration parameters of RMSI of the other slot in the implementation 3 of the disclosure.
Figure 17:
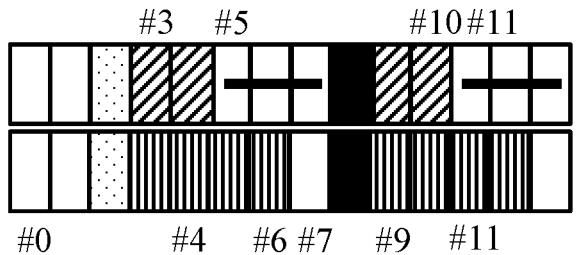
Figure 17:
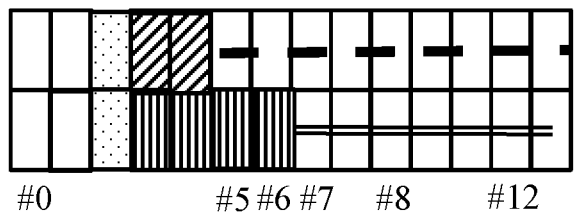

As shown in FIG. 17, it is a schematic diagram of the time-domain scheduling parameters of the PDSCH of the RMSI configured for another slot. For a slot containing SSBs, there are two cases.

Case 1 (containing two SSBs): When one slot contains two SSBs, the scheduling data length cannot span the beam switching symbol, and can only end with the beam switching symbol or start after the beam switching. As shown in FIG. 17, assuming that the PDCCH occupies two symbols, the time-domain scheduling parameters of the PDSCH include: {S=5, L=3}; {S=11, L=3}.

Case 2 (containing one SSB): When one slot contains one SSB, the scheduling data length cannot span the beam switching symbol, and can only end with the beam switching symbol or start after the beam switching. As shown in FIG. 17, assuming that the PDCCH occupies two symbols, the time-domain scheduling parameters of the PDSCH include: {S=5, L=9}; {S=7, L=7}.

To sum up, when the multiplexing relationship between SSB and Type0-PDCCH is mode 3 and the number of symbols of the PDCCH is 2, it is necessary to support the time-domain scheduling parameters of the PDSCH to include one or more of: {S=3, L=4}, {S=10, L=4}, {S=3, L=11}, {S=5, L=9}, {S=5, L=3}, {S=11, L=3}, {S=7, L=7}.

By modifying the content of the existing protocol, the above time-domain resource allocation parameters are supported when there is a beam switching interval in the high frequency. The table parameters of the existing protocol are modified to obtain the PDSCH time-domain resource allocation table C shown in Table 5.

TABLE 5

Default PDSCH time-domain resource allocation table C (Normal CP)

| Row index | dmrs-TypeA-Position | PDSCH mapping type | K0 | S | L | Remark |
|---|---|---|---|---|---|---|
| 1 (Note 1) | 2, 3 | Type B | 0 | 2 | 2 | |
| 2 | 2, 3 | Type B | 0 | 4 | 2 | |
| 3 | 2, 3 | Type B | 0 | 6 | 2 | |
|  |  |  | 0 | 5 | 3 | Note |
| 4 | 2, 3 | Type B | 0 | 8 | 2 | |
| 5 | 2, 3 | Type B | 0 | 10 | 2 | |
|  | 2, 3 | Type B | 0 | 11 | 3 | note |
| 6 | Reserved | Reserved | Reserved | Reserved | Reserved | |
| 7 | 2, 3 Reserved | Type B Reserved | 0 Reserved | 5 Reserved | 9 Reserved | note |
|  |  |  | 0 | 7 | 7 | note |
| 8 | 2, 3 | Type B | 0 | 2 | 4 | |
|  |  |  |  | 3 | 4 | note |
| 9 | 2, 3 | Type B | 0 | 4 | 4 | |
|  |  |  |  | 4 | 3 | |
| 10 | 2, 3 | Type B | 0 | 6 | 4 | |
| 11 | 2, 3 | Type B | 0 | 8 | 4 | |
| 12 | 2, 3 | Type B | 0 | 10 | 4 | Reuse |
| 13 | 2, 3 | Type B | 0 | 2 | 7 | |
| 14 | 2 | Type A | 0 | 2 | 12 | |
|  | 3 | Type A | 0 | 3 | 11 | Reuse |
| 15 | 2, 3 | Type A | 0 | 0 | 6 | |
| 16 | 2, 3 | Type A | 0 | 2 | 6 | |

In the above PDSCH time-domain resource allocation table, the time-domain parameters during beam switching are formulated. The annotation meaning of the above note is: when the SSB configured by the base station requires a beam switching interval, it corresponds to the row index value, and the parameters with note are scheduled; otherwise, the parameters in another row are scheduled.

For example, when row index=5, if the SSB configured by the base station requires beam switching, the scheduling parameters are {S=11, L=3}, otherwise {S=10, L=2}.

For example, when row index=6, if the SSB configured by the base station requires beam switching, the scheduling parameters are S=5, L=9; otherwise, the scheduling is considered invalid.

The above is the method of determining the time-domain scheduling parameters of the PDSCH when the number of symbols of the PDCCH is 2. The same method can be applied to the cases where the number of symbols of the PDCCH is 1 and the number of symbols of the PDCCH is 3, to determine the corresponding time-domain scheduling parameters of the PDCCH, specifically as follows.

When the multiplexing relationship between SSB and Type0-PDCCH is mode 3 and the number of symbols of the PDCCH is 3, it is necessary to support the time-domain scheduling parameters of the PDSCH to include one or more of: {S=4, L=3}, {S=11, L=3}, {S=4, L=10}, {S=5, L=9}, {S=6, L=2}, {S=12, L=2}, {S=7, L=7}.

When the multiplexing relationship between SSB and Type0-PDCCH is mode 3 and the number of symbols of the PDCCH is 1, it is necessary to support the time-domain scheduling parameters of the PDSCH to include one or more of: {S=2, L=5}, {S=9, L=5}, {S=2, L=12}, {S=5, L=9}, {S=4, L=4}, {S=10, L=4}, {S=7, L=7}.

Step 4: the terminal detects and receives the RMSI information according to the above configuration information.

For the specific process, reference is made to the description of the implementation 1, which will not be repeated here.

Implementation 4.

In this embodiment, the SCSs of the SSB and the Type0-PDCCH are different.

In this embodiment, two SSB candidate positions are included in one slot, the first switching time is before the start symbol of the first SSB, and the second switching time is before the start symbol of the second SSB. The start symbol of the Type0-PDCCH corresponding to the first SSB is not aligned with the start symbol of the first SSB, and the start symbol of the Type0-PDCCH corresponding to the second SSB is not aligned with the start symbol of the second SSB.

In this embodiment, the RMSI transmission process is specifically as follows.

Step 1: determine the configured SSB candidate positions and switching time positions in one slot.

In this embodiment, the configured SSB candidate positions and switching time positions in one slot are as follows.

The switching time of the first SSB (called the first switching time for short) is set at the previous symbol of the start symbol of the first SSB.

The switching time of the second SSB (called the second switching time for short) is set at the previous symbol of the start symbol of the second SSB.

Figure 18:
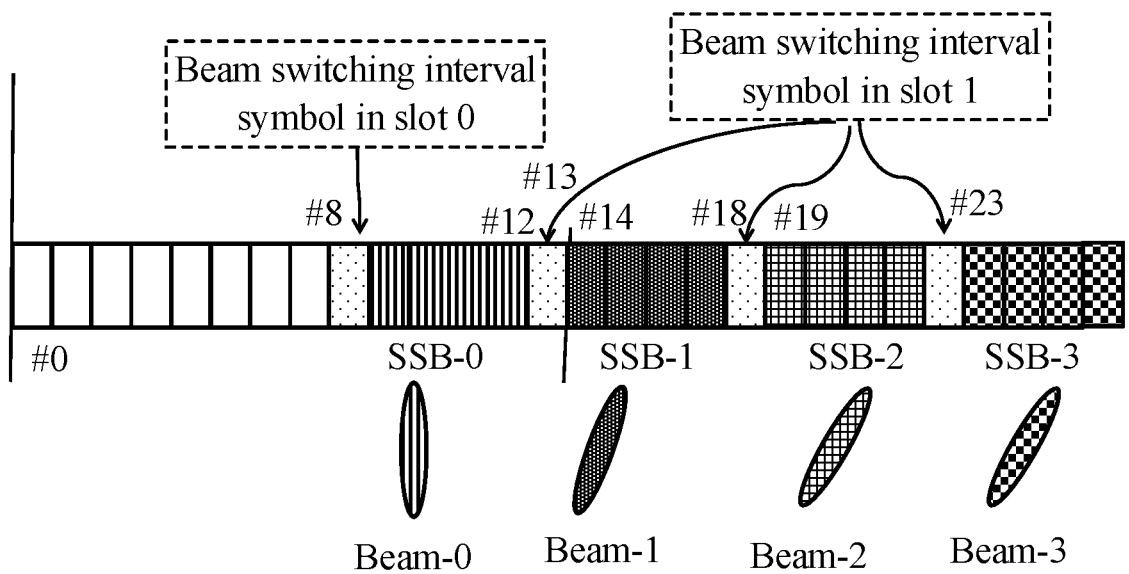
FIG. 18 is a schematic diagram of the SSB candidate position and beam switching position configured in an implementation 4 of the disclosure.

As shown in FIG. 18, it is a schematic diagram of the beam switching positions of SSBs (SCS of SSB=960 KHz). Before configuring the beam switching positions, the protocol needs to determine the SSB candidate positions. In FIG. 18, the SSB candidate positions and the number of candidates configured in two adjacent slots are different.

Candidate positions of SSBs in slot 0: the candidate position of the first SSB (SSB0) is symbol 9/10/11/12, and correspondingly, the beam switching position of SSB0 is on symbol 8.

Candidate positions of SSBs in slot 1: the candidate position of the first SSB (SSB1) is symbol 14/15/16/17 (the symbol number in units of slot is: 0/1/2/3). The candidate position of the second SSB (SSB2) is symbol 19/20/21/22 (the symbol number in units of slot is: 5/6/7/8). The candidate position of the second SSB (SSB3) is symbol 24/25/26/27 (the symbol number in units of slot is: 10/11/12/13). Correspondingly: the beam switching position of SSB1 is on the previous symbol of symbol 0 of slot 1; the beam switching position of SSB2 is on symbol 18 of slot 1; and the beam switching position of SSB3 is on symbol 23 of slot 1.

Step 2: determine the start position of the Type0-PDCCH monitoring occasion in one configured slot.

The SCS of the Type0-PDCCH here is different from the SCS of the SSB. In an example, the SCS of the SSB is 480 KHz, and the SCS of the Type0-PDCCH is 240 KHz. And it is assumed that the CP corresponding to the OFDM symbol of the Type0-PDCCH is long enough to complete the beam switching, so the beam switching symbol does not need to be considered when designing the Type0-PDCCH.

The start symbol of the Type0-PDCCH corresponding to the first SSB is: symbol 0.

The start symbol of the Type0-PDCCH corresponding to the second SSB is: symbol 1.

The start symbol of the Type0-PDCCH corresponding to the third SSB is: symbol 2.

The start symbol of the Type0-PDCCH corresponding to the fourth SSB is: symbol 3.

Figure 19:
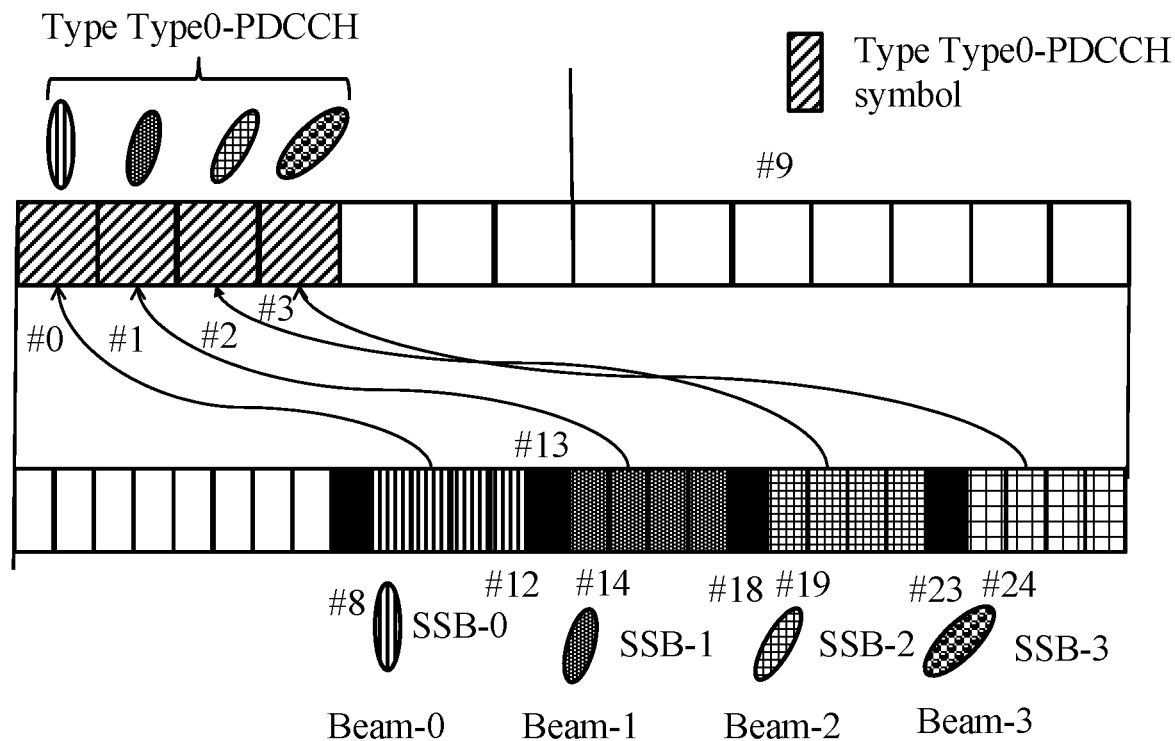
FIG. 19 is a schematic diagram of the position of the start symbol of the Type0-PDCCH corresponding to the SSB in the implementation 4 of the disclosure.

As shown in FIG. 19, it is a schematic diagram of the start symbol position of the Type0-PDCCH corresponding to the SSB. The start symbol of Type0-PDCCH corresponding to SSB-0 is #0; the start symbol of Type0-PDCCH corresponding to SSB-1 is #1; the start symbol of Type0-PDCCH corresponding to SSB-2 is #2; and the start symbol of Type0-PDCCH corresponding to SSB-3 is #3.

Step 3: determine the configured time-domain scheduling parameters of the PDSCH of the RMSI.

The parameters of the time-domain scheduling table are related to the first switching time and the second switching time, or related to the start position and the number of symbols of the Type0-PDCCH, that is to say, related to the end symbol of the Type0-PDCCH.

Figure 20:
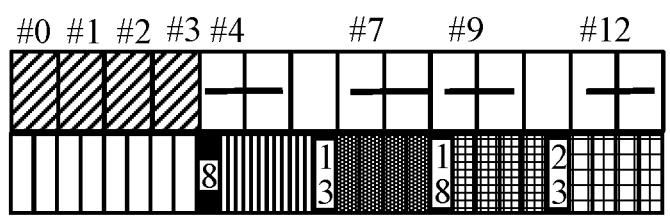
FIG. 20 is a schematic diagram of PDSCH time-domain scheduling configuration parameters of RMSI in the implementation 4 of the disclosure.
Figure 20:
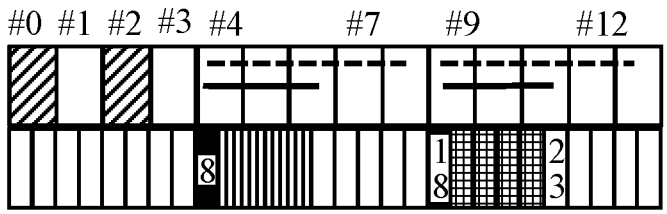

The time-domain scheduling configuration parameters of the PDSCH in the slot with SSB are determined. As shown in FIG. 20, for a slot containing SSBs, there are two cases.

1) Case 1 (containing 4 SSBs): When two slots contain 4 SSBs, the following process is performed for the case where the SSBs require the beam switching symbol and the Type0-PDCCH scheduling data does not require the beam switching symbol.

When the switching symbol position of the SSB is at the beginning of the PDSCH symbol position, the CP may be used for beam switching, so the beam switching symbol does not affect the design of the PDSCH data length (such as symbol 4 and symbol 0 in Case 1).

When the switching symbol position of the SSB is at the end of the PDSCH symbol position, the CP cannot be directly used for beam switching, so the beam switching symbol affects the design of the PDSCH data length (such as symbol 6 and symbol 11 in Case 1). It can only end with the beam switching symbol, or begin after the beam switching.

In summary, assuming that the PDCCH occupies 1 symbol, the time-domain scheduling parameters of the PDSCH include: {S=4, L=2}, {S=7, L=2}, {S=9, L=2}, {S=12, L=2}.

2) Case 2 (containing 2 SSBs): When a slot contains 2 SSBs, the analysis is the same as Case 1. Assuming that the PDCCH occupies two symbols, the time-domain scheduling parameters of the PDSCH include: {S=4, L=3}, {S=4, L=5}, {S=9, L=3}, {S=9, L=5}.

It should be noted that the candidate position 0 and candidate position 2 are selected when the PDCCH/PDSCH slot contains 2 SSBs, and the function thereof is acting as the start position of the PDCCH/PDSCH slot where the beam switching of the SSB occurs, and the CP can be used for beam switching, and it is beneficial to the efficient use of resources.

To sum up, when the multiplexing relationship between SSB and Type0-PDCCH is mode 2 (the frequency division multiplexing is used for the SSB and Type0-PDCCH, and the start positions are different), it is necessary to support the time-domain scheduling parameters of the PDSCH to include one or more oft {=4, L=2}, {S=7, L=2}, {=9, L=2}, {=12, L=2}{S=4, L=3}, {S=4, L=5}, {S=9, L=3}, {S=9, L=5}.

Further, by modifying the content of the existing protocol, the above time-domain resource allocation parameters are supported when there is a beam switching interval in the high frequency. As shown in Table 6, the existing table parameters are modified as follows.

TABLE 6

Default PDSCH time-domain resource allocation table B (Normal CP)

| Row index | dmrs-TypeA-Position | PDSCH mapping type | K0 | S | L | Remark |
|---|---|---|---|---|---|---|
| 1 | 2, 3 | Type B | 0 | 2 | 2 | |
| 2 | 2, 3 | Type B | 0 | 4 | 2 | Reuse |
| 3 | 2, 3 | Type B | 0 | 6 | 2 | |
|   | 2, 3 | Type B | 0 | 7 | 2 | note |
| 4 | 2, 3 | Type B | 0 | 8 | 2 | |
|   | 2, 3 | Type B | 0 | 9 | 2 | Note |
| 5 | 2, 3 | Type B | 0 | 10 | 2 | |
|   | 2, 3 | Type B | 0 | 12 | 2 | note |
| 6 | 2, 3 | Type B | 1 | 2 | 2 | |
| 7 | 2, 3 | Type B | 1 | 4 | 2 | |
|   | 2, 3 | Type B | 0 | 4 | 3 | note |

TABLE 6-continued

Default PDSCH time-domain resource allocation table B (Normal CP)

| Row index | dmrs-TypeA-Position | PDSCH mapping type | K0 | S | L | Remark |
|---|---|---|---|---|---|---|
| 8 | 2, 3 | Type B | 0 | 2 | 4 | |
| 9 | 2, 3 | Type B | 0 | 4 | 4 | |
|   |      |        |   | 4 | 5 | note |
| 10 | 2, 3 | Type B | 0 | 6 | 4 | |
| 11 | 2, 3 | Type B | 0 | 8 | 4 | |
| 12 | 2, 3 | Type B | 0 | 10 | 4 | |
|    | 2, 3 | Type B | 0 | 9 | 5 | note |
| 13 | 2, 3 | Type B | 0 | 2 | 7 | |
| 14) | 2 | Type A | 0 | 2 | 12 | |
|     | 3 | Type A | 0 | 3 | 11 | |
| 15 | 2, 3 | Type B | 1 | 2 | 4 | |
| 16 |      |        |   | 9 | 3 | note |
|    |      | Reserved |  |  |  | |

In the above PDSCH time-domain resource allocation table, the time-domain parameters during beam switching are formulated. The annotation meaning of the above note is: when the SSB configured by the base station requires a beam switching interval, it corresponds to the row index value, and the parameters with note are scheduled. Otherwise, the parameters in another row are scheduled.

For example: when row index=5, if the SSB configured by the base station requires beam switching, the scheduling parameters are S=12, L=2; otherwise, S=10, L=2.

For example: when row index=6, if the SSB configured by the base station requires beam switching, the scheduling parameters are S=9, L=3; otherwise, the scheduling is considered invalid.

Step 4: the terminal detects and receives the RMSI information according to the above configuration information. For the specific process, reference is made to the description of the above Implementation 1, which will not be repeated here.

Implementation 5.

In this embodiment, the extended CP is used, and the specific RMSI transmission process is as follows.

Step 1: determine the configured SSB candidate positions.

One SSB candidate position or two SSB candidate positions is/are configured in one slot, and the SSB candidate positions may be as follows:

in a single-slot configuration, a first SSB candidate position: symbol number 4/5/6/7, and a second SSB candidate position: symbol number 8/9/10/11; or in a single-slot configuration, a first SSB candidate position: symbol number 2/3/4/5, and a second SSB candidate position: symbol number 6/7/8/9; or in a multi-slot configuration, a first SSB candidate position: symbol number 4/5/6/7, a second SSB candidate position: symbol number 8/9/10/11, a third SSB candidate position: symbol number 14/15/16/17, and a fourth SSB candidate position: symbol number 18/19/20/21; or in a single-slot configuration, a first SSB candidate position: symbol number 2/3/4/5, and a second SSB candidate position: symbol number 8/9/10/11.

Step 2: configure the start position of the Type0-PDCCH monitoring occasion in one slot.

For the frequency division multiplexing mode, in one slot, the Type0-PDCCH of the first SSB is aligned with the start symbol of the first SSB, and the Type0-PDCCH of the second SSB is aligned with the start symbol of the second SSB.

Figure 21:
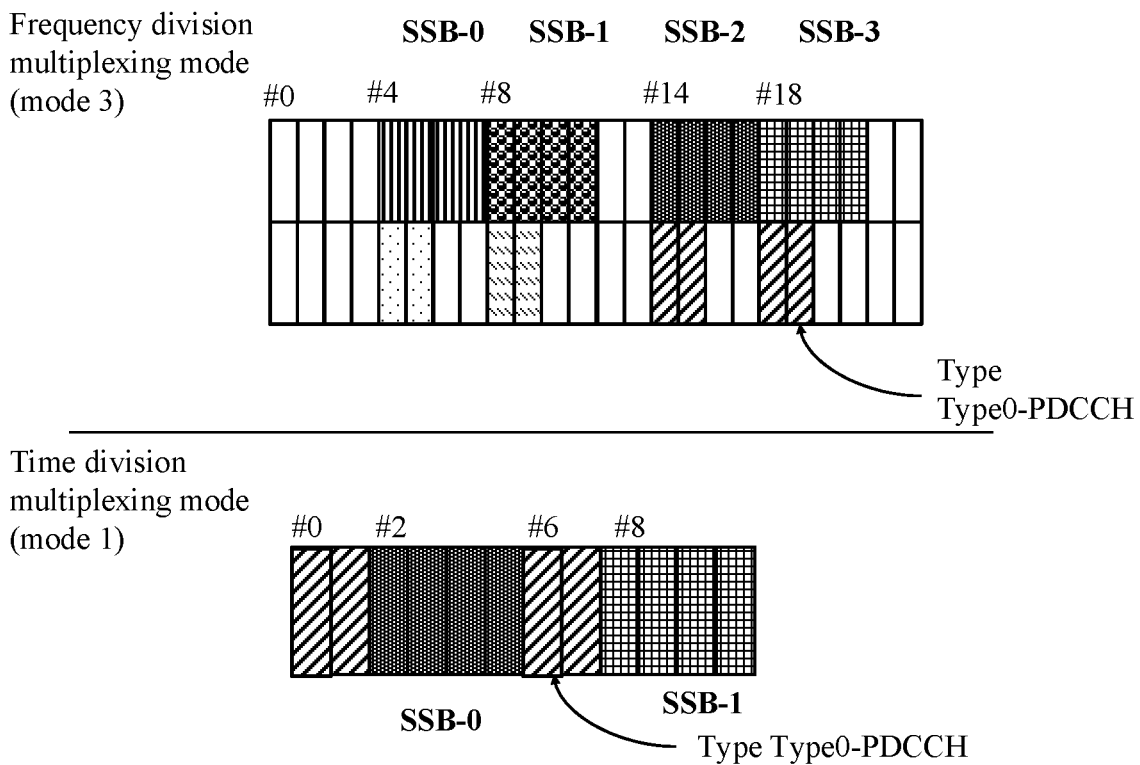
FIG. 21 is a schematic diagram of the position of the start symbol of the Type0-PDCCH corresponding to the SSB in an implementation 5 of the disclosure.

As shown in FIG. 21, it is a schematic diagram of the start symbol of the Type0-PDCCH corresponding to the SSB. For the frequency division multiplexing mode (mode 3), the start symbol of Type0-PDCCH corresponding to SSB-0 is #4; the start symbol of Type0-PDCCH corresponding to SSB-1 is #8; the start symbol of Type0-PDCCH corresponding to SSB-2 is #14; and the start symbol of Type0-PDCCH corresponding to SSB-3 is #18.

For the time division multiplexing mode (mode 1), the start symbol of Type0-PDCCH corresponding to SSB-0 is #0; and the start symbol of Type0-PDCCH corresponding to SSB-1 is #6.

Step 3: configure the PDSCH time-domain scheduling table of the RMSI.

Figure 22:
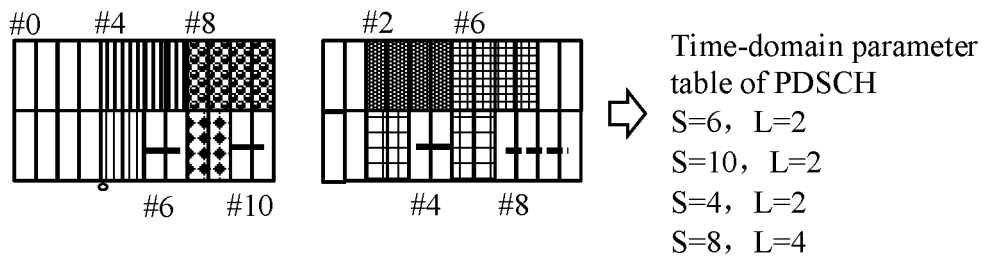
FIG. 22 is a schematic diagram of PDSCH time-domain scheduling configuration parameters of RMSI in the frequency division multiplexing mode in the implementation 5 of the disclosure.
Figure 22:
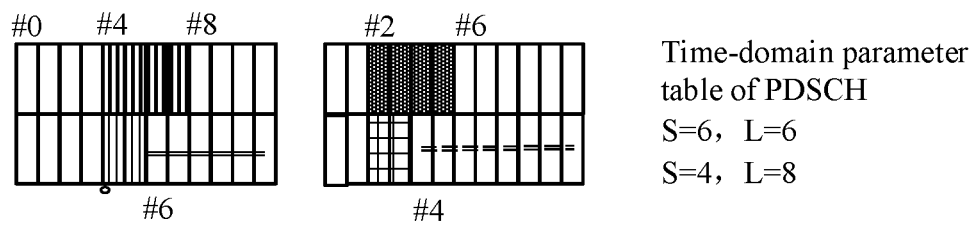

For the frequency division mode (mode 3), the time-domain scheduling configuration parameters of the PDSCH of the RMSI are as shown in FIG. 22 according to the positions of the SSBs and the multiplexing relationship. For a slot containing SSBs, there are two cases.

Case 1 (containing two SSBs): When a slot contains 2 SSBs, assuming that the PDCCH occupies two symbols in FIG. 22, the time-domain scheduling parameters of the PDSCH include: {S=6, L=2}, {S=10, L=2}, {S=4, L=2}, {S=8, L=4}.

Case 2 (containing one SSB): When a slot contains 1 SSB, assuming that the PDCCH occupies two symbols in FIG. 22, the time-domain scheduling parameters of the PDSCH include: {S=6, L=6}, {S=4, L=8}.

To sum up, in the time-domain scheduling data of the extended CP, in order to support the PDSCH scheduling of the RMSI, at least one of the following values is included: {S=6, L=2}, {S=10, L=2}, {S=4, L=2}, {S=8, L=4}, {S=6, L=6}, {S=4, L=8}.

Further, by modifying the content of the existing protocol, the above time-domain resource allocation parameters are supported when the extended CP is used. The following existing table parameters are modified to obtain the resource allocation table shown in Table 7.

TABLE 7

Default PDSCH time-domain resource allocation table C (Extended CP)

| Row index | dmrs-TypeA-Position | PDSCH mapping type | K0 | S | L | Remark |
|---|---|---|---|---|---|---|
| 1 (Note 1) | 2, 3 | Type B | 0 | 2 | 2 | |
| 2 | 2, 3 | Type B | 0 | 4 | 2 | Reuse |
| 3 | 2, 3 | Type B | 0 | 6 | 2 | Reuse |
| 4 | 2, 3 | Type B | 0 | 8 | 2 | |
| 5 | 2, 3 | Type B | 0 | 10 | 2 | Reuse |
|   | 2, 3 | Type B | 0 |    |    | |
| 6 | Reserved | Reserved | Reserved | Reserved | Reserved | |
|   | 2, 3 | Type B | 0 | 6 | 6 | note |
| 7 | Reserved | Reserved | Reserved | Reserved | Reserved | |
|   |      |        |   | 4 | 8 | note |
| 8 | 2, 3 | Type B | 0 | 2 | 4 | |
| 9 | 2, 3 | Type B | 0 | 4 | 4 | |
| 10 | 2, 3 | Type B | 0 | 6 | 4 | |
| 11 | 2, 3 | Type B | 0 | 8 | 4 | Reuse |
| 12 | 2, 3 | Type B | 0 | 10 | 4 | |
| 13 | 2, 3 | Type B | 0 | 2 | 7 | |
| 14 | 2 | Type A | 0 | 2 | 12 | |
|    | 3 | Type A | 0 | 3 | 11 | |
| 15 | 2, 3 | Type A | 0 | 0 | 6 | |
| 16 | 2, 3 | Type A | 0 | 2 | 6 | |

In the above PDSCH time-domain resource allocation table, the time-domain parameters of the slot of the extended CP are formulated. The annotation meaning of the above note is: when the SSB configured by the base station is on the extended CP, it corresponds to the row index value, and the scheduling value is the parameter with note; otherwise, the parameters in another row are scheduled.

For example, when row index=6, if the SSB configured by the base station is the extended CP, the scheduling parameters are S=6, L=6; otherwise, the scheduling is considered invalid.

The above is the method of determining the time-domain scheduling parameters of the PDSCH when the number of symbols of the PDCCH is 2. The same method can be applied to the cases where the number of symbols of the PDCCH is 1 and the number of symbols of the PDCCH is 3, to determine the corresponding time-domain scheduling parameters of the PDCCH, specifically as follows.

When the multiplexing relationship between SSB and Type0-PDCCH is mode 3 and the number of symbols of the PDCCH is 3, it is necessary to support the time-domain scheduling parameters of the PDSCH to include one or more of: {S=7, L=1}, {S=11, L=1}, {S=5, L=1}, {S=9, L=3}, {S=7, L=5}, {S=5, L=7}.

When the multiplexing relationship between SSB and Type0-PDCCH is mode 3 and the number of symbols of the PDCCH is 1, it is necessary to support the time-domain scheduling parameters of the PDSCH to include one or more of: {S=5, L=3}, {S=9, L=3}, {S=3, L=3}, {S=7, L=5}, {S=5, L=7}, {S=3, L=9}.

Figure 23:
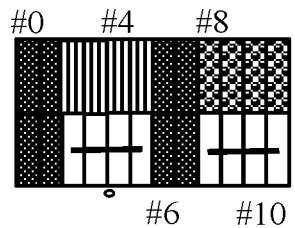
FIG. 23 is a schematic diagram of PDSCH time-domain scheduling configuration parameters of RMSI in the time division multiplexing mode in the implementation 5 of the disclosure.
Figure 23:
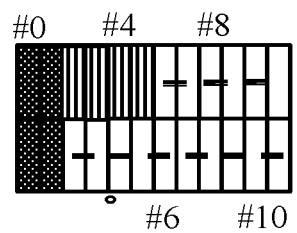

For the time division multiplexing mode, as shown in FIG. 23, for a slot containing SSBs, when the multiplexing relationship of SSB positions is mode 1, the time-domain scheduling configuration parameters of PDSCH of the RMSI are divided into two cases.

Case 1 (containing two SSBs): When a slot contains 2 SSBs, assuming that the PDCCH occupies two symbols in FIG. 23, the time-domain scheduling parameters of the PDSCH include: {S=2, L=4; S=8, L=4}.

Case 2 (containing one SSB): When a slot contains 1 SSB, assuming that the PDCCH occupies two symbols, the time-domain scheduling parameters of the PDSCH include: {S=6, L=6; S=2, L=10}.

To sum up, in the time-domain scheduling data of the extended CP, at least one of the following values is included: {S=2, L=4}, {S=8, L=4}, {S=6, L=6}, {S=2, L=10}.

Further, by modifying the content of the existing protocol, the above time-domain resource allocation parameters are supported when the extended CP is used. The following existing table parameters are modified to obtain the PDSCH time-domain resource allocation table shown in Table 8.

TABLE 8

Default PDSCH time-domain resource allocation table A (Extended CP)

| Row index | dmrs-TypeA-Position | PDSCH mapping type | K0 | S | L | Remark |
|---|---|---|---|---|---|---|
| 1 | 2 | Type A | 0 | 2 | 6 | |
|   | 3 | Type A | 0 | 3 | 5 | |
| 2 | 2 | Type A | 0 | 2 | 10 | Reuse |
|   | 3 | Type A | 0 | 3 | 9 | |
| 3 | 2 | Type A | 0 | 2 | 9 | |
|   | 3 | Type A | 0 | 3 | 8 | |
| 4 | 2 | Type A | 0 | 2 | 7 | |
|   | 3 | Type A | 0 | 3 | 6 | |
| 5 | 2 | Type A | 0 | 2 | 5 | |
|   | 3 | Type A | 0 | 3 | 4 | |
| 6 | 2 | Type B | 0 | 6 | 4 | |
|   | 3 | Type B | 0 | 8 | 2 | |
| 7 | 2 | Type B | 0 | 4 | 4 | |
|   | 3 | Type B | 0 | 6 | 4 | |
| 8 | 2, 3 | Type B | 0 | 5 | 6 | |
|   |   |   | 0 | 6 | 6 | note |
| 9 | 2, 3 | Type B | 0 | 5 | 2 | |
| 10 | 2, 3 | Type B | 0 | 9 | 2 | |
| 11 | 2, 3 | Type B | 0 | 10 | 2 | |
| 12 | 2, 3 | Type A | 0 | 1 | 11 | |
| 13 | 2, 3 | Type A | 0 | 1 | 6 | |
| 14 | 2, 3 | Type A | 0 | 2 | 4 | Reuse |
| 15 | 2, 3 | Type B | 0 | 4 | 6 | |
| 16 | 2, 3 | Type B | 0 | 8 | 4 | Reuse |

In the above PDSCH time-domain resource allocation table, the time-domain parameters of the slot of the extended CP are formulated. The annotation meaning of the above note is: when the SSB configured by the base station is on the extended CP and the RMNSI is scheduled (that is, the scheduling signaling scrambled by SI-RNTI is used in Type0-PDCCH scheduling), it corresponds to the row index value, and the parameters with note are scheduled; otherwise, the parameters in another row are scheduled.

For example, when row index=8, if the SSB configured by the base station is on the extended CP and the RMSI is scheduled (that is, the scheduling signaling scrambled by SI-RNTI is used in Type0-PDCCH scheduling), the scheduling parameters are S=6, L=6; otherwise, it is considered that the scheduling parameters are S=5, L=6.

The above is the method of determining the time-domain scheduling parameters of the PDSCH when the number of symbols of the PDCCH is 2. The same method can be applied to the case where the number of symbols of the PDCCH is 1, to determine the corresponding time-domain scheduling parameters of the PDCCH, specifically as follows.

When the multiplexing relationship between SSB and Type0-PDCCH is mode 1 and the number of symbols of the PDCCH is 1, it is necessary to support the time-domain scheduling parameters of the PDSCH to include one or more of: {S=1, L=5}, {S=7, L=5}, {S=5, L=7}, {S=1, L=11}.

Step 4: the terminal detects and receives the RMSI information according to the above configuration information, where the specific process is as follows.

Firstly, the SSB is searched, the corresponding PBCH is parsed, and the Type0-PDCCH is detected according to the parsing result.

The RMSI is received according to the scheduling information of the Type0-PDCCH and the parameter information of the time-domain scheduling table of the PDSCH of the RMSI.

Embodiment 2

Figure 24:
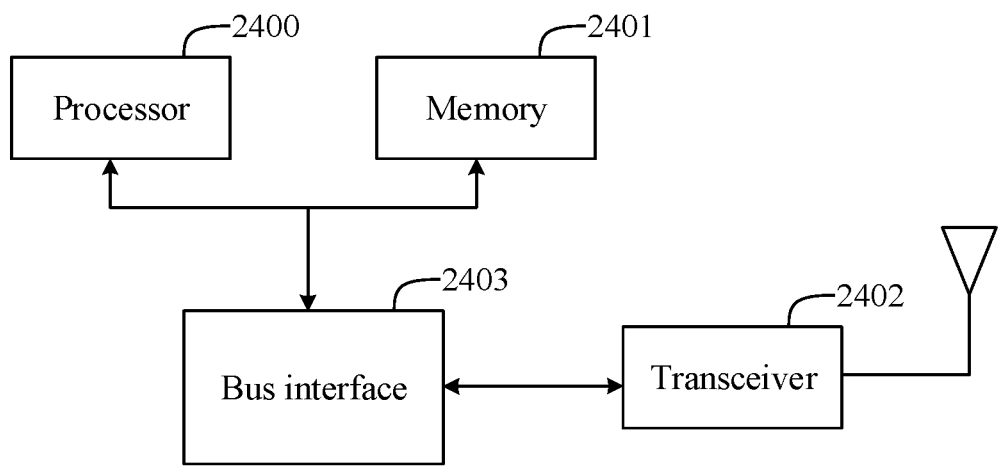
FIG. 24 is a structural schematic diagram of a device for broadcast data communication according to an embodiment of the disclosure.

An embodiment of the disclosure provides a device for broadcast data communication, as shown in FIG. 24, including:

a processor 2400, a memory 2401, a transceiver 2402 and a bus interface 2403.

The processor 2400 is responsible for managing the bus architecture and general processing, and the memory 2401 may store the data used by the processor 2400 when performing the operations. The transceiver 2402 is configured to receive and send the data under the control of the processor 2400.

The bus architecture may include any numbers of interconnected buses and bridges, and specifically link various circuits of one or more processors represented by the processor 2400 and the memory represented by the memory 2401. The bus architecture may further link various other circuits such as peripheral device, voltage regulator and power management circuit, which are all well known in the art and thus will not be further described again herein. The bus interface provides an interface. The processor 2400 is responsible for managing the bus architecture and general processing, and the memory 2401 may store the data used by the processor 2400 when performing the operations.

The procedure disclosed by the embodiment of the disclosure may be applied in the processor 2400 or implemented by the processor 2400. In the implementation process, each step of the signal processing flow may be completed by the integrated logic circuit of hardware in the processor 2400 or the instruction in the form of software. The processor 2400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 2401, and the processor 2400 reads the information in the memory 2401 and completes the steps of the signal processing flow in combination with its hardware.

Specifically, the processor 2400 is configured to read the program in the memory 2401 and perform following steps:
  determining first configuration information containing a beam switching position, or determining second configuration information containing an extended CP, and the first configuration information/second configuration information includes a configured SSB candidate position, a broadcast control channel monitoring occasion, and a time-domain scheduling parameter of a data channel for receiving broadcast data;
  transmitting an SSB and a broadcast control channel in a beam after the beam switching position or extended CP according to the first configuration information/second configuration information.

In one embodiment, for the first configuration information, the SSB candidate position is configured as:
  each SSB candidate position occupies a fixed number of OFDM symbols, and SSB candidate positions of two adjacent SSBs are discontinuous.

In one embodiment, for the first configuration information, there are two beam switching positions in one slot, which are configured in any one of following ways:
  a beam switching position of a first SSB in the slot is set at a first symbol of the slot, or a last symbol of a previous slot;
  a beam switching position of a second SSB in the slot is set at a symbol adjacent to a last symbol of the first SSB, or a previous symbol of a start symbol of the second SSB.

In one embodiment, for the first configuration information, the broadcast control channel monitoring occasion is configured as any one of:
  a start symbol of a broadcast control channel corresponding to a first SSB in a slot is a first symbol after a beam switching position of the first SSB, or is in a position same as a position of a start symbol of the first SSB;
  a start symbol of a broadcast control channel corresponding to a second SSB in the slot is a first symbol after a beam switching position of the second SSB, or is in a position same as a position of a start symbol of the second SSB.

In one embodiment, for the first configuration information, the time-domain scheduling parameter of the data channel is configured in a following way:
  the time-domain scheduling parameter of the data channel is related to the beam switching position; or
  the time-domain scheduling parameter of the data channel is related to an end symbol of the broadcast control channel monitoring occasion.

In one embodiment, the time-domain scheduling parameter of the data channel includes a start symbol and the number of symbols, and the time-domain scheduling parameter of the data channel is configured in a following way:
  the start symbol of the data channel ends with the beam switching symbol or begins with the beam switching symbol.

In one embodiment, the processor is configured to:
  determine the beam switching position through indication information of the beam switching position defined by an interface protocol; or
  determine the beam switching position through the SSB candidate position, the broadcast control channel monitoring occasion, and the time-domain scheduling parameter of the data channel for receiving the broadcast data configured in the first configuration information.

In one embodiment, the processor determines the beam switching position by at least one of following steps:
  determining that a broadcast control channel corresponding to a first SSB in a slot is at a second symbol of the slot, and determining that a beam switching position of the first SSB in the slot is at a first symbol of the slot;
  determining that the broadcast control channel corresponding to the first SSB in the slot is at the first symbol of the slot, and determining that the beam switching position of the first SSB in the slot is at a last symbol of a previous slot;
  determining that there is an interval of only one symbol between a start symbol of a broadcast control channel corresponding to a second SSB in the slot and a last symbol of the first SSB in the slot, and determining that a beam switching position of the second SSB is at a symbol adjacent to the last symbol of the first SSB;
  determining that a frequency division multiplexing mode is used for the broadcast control channel and the second SSB in the slot, and determining that the switching time of the second SSB is at a previous symbol of a start symbol of the second SSB.

In one embodiment, when a multiplexing relationship between the SSB and the broadcast control channel is using a time division multiplexing mode 1, the broadcast control channel monitoring occasion and the time-domain scheduling parameter of the data channel are configured as:
  at least one time-domain scheduling parameter among {S=2, L=4}, {S=9, L=4}, {S=2, L=11} and {S=6, L=7}; or
  at least one time-domain scheduling parameter among {S=3, L=3}, {S=10, L=3}, {S=3, L=10} and {S=6, L=7}; or
  at least one time-domain scheduling parameter among {S=1, L=5}, {S=8, L=5}, {S=1, L=12} and {S=6, L=7};
  and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:
  at least one time-domain scheduling parameter among {S=4, L=2}, {S=7, L=2}, {S=11, L=2}, {S=4, L=9} and {S=6, L=7}; or
  at least one time-domain scheduling parameter among {S=5, L=1}, {S=7, L=2}, {S=12, L=1}, {S=5, L=8} and {S=6, L=7}; or
  at least one time-domain scheduling parameter among {S=3, L=3}, {S=7, L=2}, {S=10, L=3}, {S=3, L=10} and {S=6, L=7};
  and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:
  at least one time-domain scheduling parameter among {S=3, L=4}, {S=10, L=4}, {S=3, L=11}, {S=5, L=9}, {S=5, L=3}, {S=11, L=3} and {S=7, L=7}; or
  at least one time-domain scheduling parameter among {S=4, L=3}, {S=11, L=3}, {S=4, L=10}, {S=5, L=9}, {S=6, L=2}, {S=12, L=2} and {S=7, L=7}; or
  at least one time-domain scheduling parameter among {S=2, L=5}, {S=9, L=5}, {S=2, L=12}, {S=5, L=9}, {S=4, L=4}, {S=10, L=4} and {S=7, L=7};
  and S is a start symbol of the data channel, and L is the number of symbols of the data channel.

In one embodiment, when a multiplexing relationship between the SSB and the broadcast control channel is using a frequency division multiplexing mode 2, the broadcast control channel monitoring occasion and the time-domain scheduling parameter of the data channel are configured as:
  at least one time-domain scheduling parameter among {S=4, L=2}, {S=7, L=2}, {S=9, L=2}, {S=12, L=2}, {S=4, L=3}, {S=4, L=5}, {S=9, L=3} and {S=9, L=5};
  and S is a start symbol of the data channel, and L is the number of symbols of the data channel.

In one embodiment, for the second configuration information, the SSB candidate position is configured as:
  in a single-slot configuration, a first SSB candidate position: symbol number 4/5/6/7, and a second SSB candidate position: symbol number 8/9/10/11; or in a single-slot configuration, a first SSB candidate position: symbol number 2/3/4/5, and a second SSB candidate position: symbol number 6/7/8/9; or
  in a multi-slot configuration, a first SSB candidate position: symbol number 4/5/6/7, a second SSB candidate position: symbol number 8/9/10/11, a third SSB candidate position: symbol number 14/15/16/17, and a fourth SSB candidate position: symbol number 18/19/20/21; or
  in a single-slot configuration, a first SSB candidate position: symbol number 2/3/4/5, and a second SSB candidate position: symbol number 8/9/10/11.

In one embodiment, for the second configuration information, when a multiplexing relationship between the SSB and the broadcast control channel is using a frequency division multiplexing mode 3, the broadcast control channel monitoring occasion and the time-domain scheduling parameter of the data channel are configured as:
  at least one time-domain scheduling parameter among {S=6, L=2}, {S=10, L=2}, {S=4, L=2}, {S=8, L=4}, {S=6, L=6} and {S=4, L=8}; or
  at least one time-domain scheduling parameter among {S=7, L=1}, {S=11, L=1}, {S=5, L=1}, {S=9, L=3}, {S=7, L=5} and {S=5, L=7}; or
  at least one time-domain scheduling parameter among {S=5, L=3}, {S=9, L=3}, {S=3, L=3}, {S=7, L=5}, {S=5, L=7} and {S=3, L=9};
  and S is a start symbol of the data channel, and L is the number of symbols of the data channel.

In one embodiment, for the second configuration information, when a multiplexing relationship between the SSB and the broadcast control channel is using a time division multiplexing mode 1, the broadcast control channel monitoring occasion and the time-domain scheduling parameter of the data channel are configured as:
  at least one time-domain scheduling parameter among {S=2, L=4}, {S=8, L=4}, {S=6, L=6} and {S=2, L=10}; or
  at least one time-domain scheduling parameter among {S=1, L=5}, {S=7, L=5}, {S=5, L=7} and {S=1, L=11};
  and S is a start symbol of the data channel, and L is the number of symbols of the data channel.

In one embodiment, the device is a base station, the processor transmits the SSB and the broadcast control channel in the beam after the beam switching position or extended CP, including:
  sending the SSB and the broadcast control channel in the beam after the beam switching position or extended CP according to the SSB candidate position and the broadcast control channel monitoring occasion;
  sending the broadcast data in the data channel according to the broadcast control channel and the time-domain scheduling parameter.

In one embodiment, the device is a UE, the processor transmits the SSB and the broadcast control channel in the beam after the beam switching position or extended CP, including:
  receiving the SSB and the broadcast control channel in the beam after the beam switching position or extended CP according to the SSB candidate position and the broadcast control channel monitoring occasion;
  receiving the broadcast data in the data channel according to the broadcast control channel and the time-domain scheduling parameter.

Figure 25:
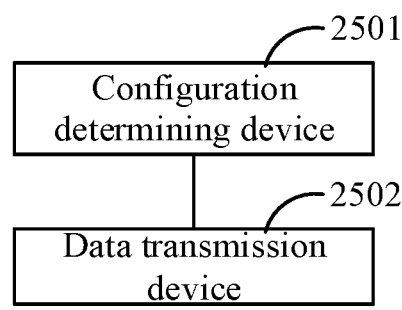
FIG. 25 is a structural schematic diagram of another device for broadcast data communication according to an embodiment of the disclosure.

The disclosure provides an apparatus for broadcast data communication, as shown in FIG. 25, including:
  a configuration determining device 2501 configured to determine first configuration information containing a beam switching position, or determine second configuration information containing an extended CP, and the first configuration information/second configuration information includes a configured SSB candidate position, a broadcast control channel monitoring occasion, and a time-domain scheduling parameter of a data channel for receiving broadcast data;

a data transmission device 2502 configured to transmit an SSB and a broadcast control channel in a beam after the beam switching position or extended CP according to the first configuration information/second configuration information.

In one embodiment, the configuration determining device, for the first configuration information, configures the SSB candidate position as:

each SSB candidate position occupies a fixed number of OFDM symbols, and SSB candidate positions of two adjacent SSBs are discontinuous.

In one embodiment, the configuration determining device, for the first configuration information, configures two beam switching positions in one slot in any one of following ways:

a beam switching position of a first SSB in the slot is set at a first symbol of the slot, or a last symbol of a previous slot;

a beam switching position of a second SSB in the slot is set at a symbol adjacent to a last symbol of the first SSB, or a previous symbol of a start symbol of the second SSB.

In one embodiment, the configuration determining device, for the first configuration information, configures the broadcast control channel monitoring occasion as any one of:

a start symbol of a broadcast control channel corresponding to a first SSB in a slot is a first symbol after a beam switching position of the first SSB, or is in a position same as a position of a start symbol of the first SSB;

a start symbol of a broadcast control channel corresponding to a second SSB in the slot is a first symbol after a beam switching position of the second SSB, or is in a position same as a position of a start symbol of the second SSB.

In one embodiment, the configuration determining device, for the first configuration information, configures the time-domain scheduling parameter of the data channel in a following way:

the time-domain scheduling parameter of the data channel is related to the beam switching position; or the time-domain scheduling parameter of the data channel is related to an end symbol of the broadcast control channel monitoring occasion.

In one embodiment, the time-domain scheduling parameter of the data channel includes a start symbol and the number of symbols, and the time-domain scheduling parameter of the data channel is configured in a following way:

the start symbol of the data channel ends with the beam switching symbol or begins with the beam switching symbol.

In one embodiment, the configuration determining device is further configured to:

determine the beam switching position through indication information of the beam switching position defined by an interface protocol; or determine the beam switching position through the SSB candidate position, the broadcast control channel monitoring occasion, and the time-domain scheduling parameter of the data channel for receiving the broadcast data configured in the first configuration information.

In one embodiment, the configuration determining device determines the beam switching position by at least one of following steps:

determining that a broadcast control channel corresponding to a first SSB in a slot is at a second symbol of the slot, and determining that a beam switching position of the first SSB in the slot is at a first symbol of the slot;

determining that the broadcast control channel corresponding to the first SSB in the slot is at the first symbol of the slot, and determining that the beam switching position of the first SSB in the slot is at a last symbol of a previous slot;

determining that there is an interval of only one symbol between a start symbol of a broadcast control channel corresponding to a second SSB in the slot and a last symbol of the first SSB in the slot, and determining that a beam switching position of the second SSB is at a symbol adjacent to the last symbol of the first SSB;

determining that a frequency division multiplexing mode is used for the broadcast control channel and the second SSB in the slot, and determining that the switching time of the second SSB is at a previous symbol of a start symbol of the second SSB.

In one embodiment, when a multiplexing relationship between the SSB and the broadcast control channel is using a time division multiplexing mode 1, the broadcast control channel monitoring occasion and the time-domain scheduling parameter of the data channel are configured as:

at least one time-domain scheduling parameter among {S=2, L=4}, {S=9, L=4}, {S=2, L=11} and {S=6, L=7}; or at least one time-domain scheduling parameter among {S=3, L=3}, {S=10, L=3}, {S=3, L=10} and {S=6, L=7}; or at least one time-domain scheduling parameter among {S=1, L=5}, {S=8, L=5}, {S=1, L=12} and {S=6, L=7};

and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:

at least one time-domain scheduling parameter among {S=4, L=2}, {S=7, L=2}, {S=11, L=2}, {S=4, L=9} and {S=6, L=7}; or at least one time-domain scheduling parameter among {S=5, L=1}, {S=7, L=2}, {S=12, L=1}, {S=5, L=8} and {S=6, L=7}; or at least one time-domain scheduling parameter among {S=3, L=3}, {S=7, L=2}, {S=10, L=3}, {S=3, L=10} and {S=6, L=7};

and S is a start symbol of the data channel, and L is the number of symbols of the data channel.

In one embodiment, when a multiplexing relationship between the SSB and the broadcast control channel is using a frequency division multiplexing mode 3, the broadcast control channel monitoring occasion and the time-domain scheduling parameter of the data channel are configured as:

at least one time-domain scheduling parameter among {S=3, L=4}, {S=10, L=4}, {S=3, L=11}, {S=5, L=9}, {S=5, L=3}, {S=11, L=3} and {S=7, L=7}; or at least one time-domain scheduling parameter among {S=4, L=3}, {S=11, L=3}, {S=4, L=10}, {S=5, L=9}, {S=6, L=2}, {S=12, L=2} and {S=7, L=7}; or at least one time-domain scheduling parameter among {S=2, L=5}, {S=9, L=5}, {S=2, L=12}, {S=5, L=9}, {S=4, L=4}, {S=10, L=4} and {S=7, L=7};

and S is a start symbol of the data channel, and L is the number of symbols of the data channel.

In one embodiment, when a multiplexing relationship between the SSB and the broadcast control channel is using a frequency division multiplexing mode 2, the broadcast control channel monitoring occasion and the time-domain scheduling parameter of the data channel are configured as:
- at least one time-domain scheduling parameter among {S=4, L=2}, {S=7, L=2}, {S=9, L=2}, {S=12, L=2}, {S=4, L=3}, {S=4, L=5}, {S=9, L=3} and {S=9, L=5};
- and S is a start symbol of the data channel, and L is the number of symbols of the data channel.

In one embodiment, the configuration determining device, for the second configuration information, configures the SSB candidate position as:
- in a single-slot configuration, a first SSB candidate position: symbol number 4/5/6/7, and a second SSB candidate position: symbol number 8/9/10/11; or in a single-slot configuration, a first SSB candidate position: symbol number 2/3/4/5, and a second SSB candidate position: symbol number 6/7/8/9; or
- in a multi-slot configuration, a first SSB candidate position: symbol number 4/5/6/7, a second SSB candidate position: symbol number 8/9/10/11, a third SSB candidate position: symbol number 14/15/16/17, and a fourth SSB candidate position: symbol number 18/19/20/21; or
- in a single-slot configuration, a first SSB candidate position: symbol number 2/3/4/5, and a second SSB candidate position: symbol number 8/9/10/11.

In one embodiment, for the second configuration information, the configuration determining device, when a multiplexing relationship between the SSB and the broadcast control channel is using a frequency division multiplexing mode 3, configures the broadcast control channel monitoring occasion and the time-domain scheduling parameter of the data channel as:
- at least one time-domain scheduling parameter among {S=6, L=2}, {S=10, L=2}, {S=4, L=2}, {S=8, L=4}, {S=6, L=6} and {S=4, L=8}; or
- at least one time-domain scheduling parameter among {S=7, L=1}, {S=11, L=1}, {S=5, L=1}, {S=9, L=3}, {S=7, L=5} and {S=5, L=7}; or
- at least one time-domain scheduling parameter among {S=5, L=3}, {S=9, L=3}, {S=3, L=3}, {S=7, L=5}, {S=5, L=7} and {S=3, L=9};
- and S is a start symbol of the data channel, and L is the number of symbols of the data channel.

In one embodiment, for the second configuration information, the configuration determining device, when a multiplexing relationship between the SSB and the broadcast control channel is using a time division multiplexing mode 1, configures the broadcast control channel monitoring occasion and the time-domain scheduling parameter of the data channel as:
- at least one time-domain scheduling parameter among {S=2, L=4}, {S=8, L=4}, {S=6, L=6} and {S=2, L=10}; or
- at least one time-domain scheduling parameter among {S=1, L=5}, {S=7, L=5}, {S=5, L=7} and {S=1, L=11};
- and S is a start symbol of the data channel, and L is the number of symbols of the data channel.

In one embodiment, the method is applied to a base station, the data transmission device transmits the SSB and the broadcast control channel in the beam after the beam switching position or extended CP, including:

sending the SSB and the broadcast control channel in the beam after the beam switching position or extended CP according to the SSB candidate position and the broadcast control channel monitoring occasion;

sending the broadcast data in the data channel according to the broadcast control channel and the time-domain scheduling parameter.

In one embodiment, the method is applied to a UE, the data transmission device transmits the SSB and the broadcast control channel in the beam after the beam switching position or extended CP, including:

receiving the SSB and the broadcast control channel in the beam after the beam switching position or extended CP according to the SSB candidate position and the broadcast control channel monitoring occasion;

receiving the broadcast data in the data channel according to the broadcast control channel and the time-domain scheduling parameter.

The above apparatus and device for broadcast data communication provided in this embodiment of the disclosure belong to the same embodiments as the method for broadcast data communication in the above Embodiment 1 of the disclosure, and various implementations applied to the method for broadcast data communication provided in the above embodiment may be applied to the apparatus and device for broadcast data communication in this embodiment, which will not be repeated here.

The disclosure provides a computer program medium storing a computer program thereon, where the program, when executed by a processor, implements the process of the RMSI transmission method provided in the above embodiment. For details, reference may be made to the description of Embodiment 1, which will not be repeated here.

An embodiment of the disclosure provides a chip, which is coupled to a memory in a device, and the chip invokes program instructions stored in the memory when running, to implement the above various embodiments of the present application and any possible method involved in the various embodiments.

An embodiment of the disclosure provides a computer program product which, when running on an electronic device, causes the electronic device to implement the above various embodiments of the present application and any possible method involved in the various embodiments.

In the several embodiments provided by the present application, it should be understood that the disclosed system, devices and methods may be implemented in other manners. For example, the device embodiments described above are only schematic, for example, the division of the modules is merely a logical function division. In an actual implementation, there may be other division manners, for example, modules or components may be combined or integrated to another system, or some features may be ignored or not performed. In addition, the displayed or discussed mutual coupling or direct coupling or communication connection may be implemented through the indirect coupling or communication connection between some interfaces, devices or modules, and may be in the electrical or other forms.

The modules described as separate components may or may not be physically separated, and the components displayed as modules may or may not be physical modules, that is, may be located in one place or may be distributed onto multiple network modules. Some or all of the modules may be selected according to the actual needs to achieve the objects of the solutions of the embodiments.

In addition, the functional modules in each embodiment of the present application may be integrated into one processing module, or each module may exist alone physically, or two or more modules may be integrated into one module. The above-mentioned integrated modules can be implemented in the form of hardware, or can be implemented in the form of software functional modules. When the integrated module is implemented in the form of software functional module and sold or used as an independent product, it may be stored in a computer readable storage medium.

The above embodiments may be implemented in whole or in part by software, hardware, firmware or any combination thereof. When implemented by software, they may be implemented in the form of a computer program product in whole or in part.

The computer program product includes one or more computer instructions. When the computer program instructions are loaded and executed on a computer, the processes or functions described in the embodiments of the present application are generated in whole or in part. The computer may be a general-purpose computer, a special-purpose computer, a computer network, or other programmable devices. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, wireless, microwave, etc.) way. The computer readable storage medium may be any available medium that can be stored by a computer, or a data storage device such as server or data center that is integrated with one or more available media. The available medium may be a magnetic medium (for example, floppy disk, hard disk, magnetic tape), an optical medium (for example, DVD), or a semiconductor medium (for example, Solid State Disk (SSD)), etc.

The embodiments of the present application are introduced in detail above, specific examples are used in the present application to illustrate the principles and embodiments of the present application, and the description of the above embodiments is only used to help the understanding of the methods of the present application and the core ideas thereof; and at the same time, modifications can be made on the specific embodiments and the application scope according to the ideas of the present application. In summary, the content of this specification should not be construed as a limitation on the present application.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for broadcast data communication, comprising:
   determining a first configuration information, wherein the first configuration information comprises a configured Synchronization Signal Block, SSB, candidate position, a broadcast control channel monitoring occasion, and a time-domain scheduling parameter of a data channel for receiving broadcast data;
   transmitting an SSB and a broadcast control channel according to the first configuration information;
   wherein the SSB candidate position is configured as:
   each SSB candidate position occupies a fixed number of OFDM symbols, and SSB candidate positions of two adjacent SSBs are discontinuous;
   wherein in a single-slot configuration, a first SSB candidate position: symbol number 2/3/4/5, and a second SSB candidate position: symbol number 9/10/11/12.

2. The method according to claim 1, wherein the broadcast control channel monitoring occasion is configured as any one of:
   a start symbol of a broadcast control channel corresponding to a first SSB in a slot is a first symbol after a beam switching position of the first SSB, or is in a position same as a position of a start symbol of the first SSB;
   a start symbol of a broadcast control channel corresponding to a second SSB in the slot is a first symbol after a beam switching position of the second SSB, or is in a position same as a position of a start symbol of the second SSB.

3. The method according to claim 1, wherein in response to a mode 1 in which a multiplexing relationship between the SSB and the broadcast control channel is a time division multiplexing, the time-domain scheduling parameter of the data channel are configured as:
   at least one time-domain scheduling parameter among $\{S=2, L=4\}$, $\{S=9, L=4\}$, $\{S=2, L=11\}$ or $\{S=6, L=7\}$; or at least one time-domain scheduling parameter among {S=3, L=3}, {S=10, L=3}, {S=3, L=10} or {S=6, L=7}; or at least one time-domain scheduling parameter among {S=1, L=5}, {S=8, L=5}, {S=1, L=12} or {S=6, L=7};

wherein S is a start symbol of the data channel, and L is a quantity of symbols of the data channel;

in response to a mode 3 in which a multiplexing relationship between the SSB and the broadcast control channel is a frequency division multiplexing, the time-domain scheduling parameter of the data channel are configured as:

at least one time-domain scheduling parameter among {S=4, L=2}, {S=7, L=2}, {S=11, L=2}, {S=4, L=9} or {S=6, L=7}; or at least one time-domain scheduling parameter among {S=5, L=1}, {S=7, L=2}, {S=12, L=1}, {S=5, L=8} or {S=6, L=7}; or at least one time-domain scheduling parameter among {S=3, L=3}, {S=7, L=2}, {S=10, L=3}, {S=3, L=10} and {S=6, L=7};

wherein S is a start symbol of the data channel, and L is a quantity of symbols of the data channel.

4. The method according to claim 1, wherein in response to a mode 3 in which a multiplexing relationship between the SSB and the broadcast control channel being a frequency division multiplexing, the time-domain scheduling parameter of the data channel are configured as:

at least one time-domain scheduling parameter among {S=3, L=4}, {S=10, L=4}, {S=3, L=11}, {S=5, L=9}, {S=5, L=3}, {S=11, L=3} or {S=7, L=7}; or at least one time-domain scheduling parameter among {S=4, L=3}, {S=11, L=3}, {S=4, L=10}, {S=5, L=9}, {S=6, L=2}, {S=12, L=2} or {S=7, L=7}; or at least one time-domain scheduling parameter among {S=2, L=5}, {S=9, L=5}, {S=2, L=12}, {S=5, L=9}, {S=4, L=4}, {S=10, L=4} or {S=7, L=7};

wherein S is a start symbol of the data channel, and L is a quantity of symbols of the data channel;

in response to a mode 2 in which a multiplexing relationship between the SSB and the broadcast control channel being a frequency division multiplexing, the broadcast control channel monitoring occasion and the time-domain scheduling parameter of the data channel are configured as:

at least one time-domain scheduling parameter among {S=4, L=2}, {S=7, L=2}, {S=9, L=2}, {S=12, L=2}, {S=4, L=3}, {S=4, L=5}, {S=9, L=3} or {S=9, L=5};

wherein S is a start symbol of the data channel, and L is a quantity of symbols of the data channel.

* * * * *